(12) United States Patent
Makino

(10) Patent No.: US 9,202,521 B2
(45) Date of Patent: Dec. 1, 2015

(54) COMMENT CREATING-DISPLAYING DEVICE, METHOD OF CREATING AND DISPLAYING COMMENT, AND COMMENT CREATING AND DISPLAYING PROGRAM

(71) Applicant: JVC KENWOOD Corporation, Yokohama-shi (JP)

(72) Inventor: Masaaki Makino, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 230 days.

(21) Appl. No.: 14/051,109

(22) Filed: Oct. 10, 2013

(65) Prior Publication Data

US 2014/0099070 A1    Apr. 10, 2014

(30) Foreign Application Priority Data

Oct. 10, 2012  (JP) ................. 2012-225037
Oct. 10, 2012  (JP) ................. 2012-225052

(51) Int. Cl.

| | | |
|---|---|---|
| H04N 9/80 | (2006.01) | |
| G11B 27/029 | (2006.01) | |
| G11B 27/10 | (2006.01) | |
| H04N 5/85 | (2006.01) | |
| G11B 27/031 | (2006.01) | |
| G11B 27/32 | (2006.01) | |

(52) U.S. Cl.
CPC ............ *G11B 27/029* (2013.01); *G11B 27/031* (2013.01); *G11B 27/105* (2013.01); *G11B 27/322* (2013.01); *H04N 5/85* (2013.01)

(58) Field of Classification Search
CPC ............................. G11B 27/105; H04N 5/85

USPC .................................................. 386/239–241
See application file for complete search history.

(56) References Cited

U.S. PATENT DOCUMENTS

2011/0273474 A1* 11/2011 Iwayama ................. 345/636

FOREIGN PATENT DOCUMENTS

| JP | 2006-098512 | 4/2006 |
| JP | 2008-172745 | 7/2008 |
| JP | 2009-094653 | 4/2009 |

* cited by examiner

*Primary Examiner* — Thai Tran
*Assistant Examiner* — Mishawn Hunter
(74) *Attorney, Agent, or Firm* — Venable LLP; Michael A. Sartori

(57) ABSTRACT

A comment creating-displaying device includes: a comment storing unit that stores comment information in which a comment character string representing a character string displayed during reproduction of video captured during movement and a comment coordinate value representing coordinate information of a capture location at which the comment character string is displayed are associated with each other; a first acquisition unit that acquires positioning data that is information including the video, positioning time representing time when the capture location of the video is positioned, and a positioning point representing coordinate information of the capture location of the video; a reproduction control unit that controls reproduction of the acquired video; and a second acquisition unit that acquires the comment character string, which has a distance from the positioning point of the positioning data corresponding to the reproduction time of the video.

13 Claims, 17 Drawing Sheets

FIG.2

| MOVEMENT INFORMATION ID | VIDEO ID | POSITIONING START TIME | POSITIONING DATA | |
|---|---|---|---|---|
| | | | POSITIONING TIME | POSITIONING POINT (LONGITUDE, LATITUDE) |
| MOVEMENT INFORMATION 1 | Movie1 | 02/12/2012 12:00:00 | 02/12/2012 12:00:00 | (139.611543, 35.464917) |
| | | | 02/12/2012 12:00:03 | (139.611747, 35.465135) |
| | | | 02/12/2012 12:00:06 | (139.612327, 35.465738) |
| | | | 02/12/2012 12:00:09 | (139.612659, 35.466097) |
| | | | ... | ... |
| MOVEMENT INFORMATION 2 | Movie2 | 02/14/2012 09:00:00 | 02/14/2012 09:00:00 | (139.612767, 35.464926) |
| | | | 02/14/2012 09:00:03 | (139.612402, 35.465162) |
| | | | 02/14/2012 09:00:06 | (139.611640, 35.465686) |
| | | | 02/14/2012 09:00:09 | (139.611441, 35.465887) |
| | | | ... | ... |
| ... | ... | ... | ... | ... |

| COMMENT ID | VIDEO ID | COMMENT CHARACTER STRING | COMMENT COORDINATE VALUE |
|---|---|---|---|
| Comment1 | Movie1 | RAMEN HERE IS TASTY. | (139.612327, 35.465738) |
| Comment2 | Movie2 | PARENTS' HOUSE OF ENTERTAINER A | (139.611441, 35.465887) |
| ... | ... | ... | ... |

113

| RELATIVE REPRODUCTION TIME | COMMENT CHARACTER STRING |
|---|---|
| 00:00:12 | CURVE HERE HAS BAD VISIBILITY |
| 00:01:50 | ISLAND IS VISIBLE WHEN WEATHER IS GOOD |
| ⋮ | ⋮ |

COMMENT CREATING-DISPLAYING DEVICE, METHOD OF CREATING AND DISPLAYING COMMENT, AND COMMENT CREATING AND DISPLAYING PROGRAM

CROSS-REFERENCE TO RELATED APPLICATIONS

The present application claims priority to and incorporates by reference the entire contents of Japanese Patent Application No. 2012-225037 filed in Japan on Oct. 10, 2012 and Japanese Patent Application No. 2012-225052 filed in Japan on Oct. 10, 2012.

BACKGROUND OF THE INVENTION

1. Field of the Invention

The present invention relates to a comment creating-displaying device, a method of creating and displaying a comment, and a comment creating and displaying program.

2. Description of the Related Art

In recent years, in accordance with the spread of terminals such as multi-function mobile phones (smartphones) each having a global positioning system (GPS) receiver built therein, various services using location information are provided. As one form of such services, there are services in which a comment is shared among users by displaying the comment, which is input by a user, relating to a specific position on a map.

For example, in Japanese Laid-open Patent Publication No. 2006-98512, a technology is disclosed in which data is shared among users by registering data owned by each user on a map. Regarding a technology for sharing comments not in a map but in a moving image, in Japanese Laid-open Patent Publication No. 2009-94653, a technology is disclosed in which comments are stored respectively in association with elapse times from the start of reproduction of a moving image, and a comment corresponding to an elapse time is displayed in an overlapping manner when the moving image is reproduced.

However, in the conventional technologies, there is a problem in that a comment corresponding to the location of video that is in the middle of reproduction is not displayable. For example, in Japanese Laid-open Patent Publication No. 2006-98512, communication is achieved through the map. However, since the map is a bird's eye view, there is a possibility that it takes a time for acquiring the location of a commented site without enlarging a specific area or the like. In addition, in Japanese Laid-open Patent Publication No. 2009-94653, a comment corresponding to the reproduction time of a moving image is displayed, and thus, a comment corresponding to the location represented by a moving image that is in the middle of reproduction is not displayed.

SUMMARY OF THE INVENTION

It is an object of the present invention to at least partially solve the problems in the conventional technology.

According to an aspect of the present invention a comment creating-displaying device includes: a comment storing unit that stores comment information in which a comment character string representing a character string displayed during reproduction of video captured during movement and a comment coordinate value representing coordinate information of a capture location at which the comment character string is displayed are associated with each other; a first acquisition unit that acquires positioning data that is information including the video, positioning time representing time when the capture location of the video is positioned, and a positioning point representing coordinate information of the capture location of the video; a reproduction control unit that controls reproduction of the acquired video; and a second acquisition unit that acquires the comment character string, which has a distance from the positioning point of the positioning data corresponding to the reproduction time of the video that is in the middle of the reproduction to be a predetermined distance or less, corresponding to the comment coordinate value stored in the comment storing unit. And the reproduction control unit displays the acquired comment character string on a display screen on which the video is displayed.

According to another aspect of the present invention, a method of creating and displaying a comment includes: acquiring video that is captured during movement and positioning data that is information including positioning time representing time when a capture location of the video is positioned and a positioning point representing coordinate information of the capture location of the video; controlling reproduction of the acquired video; acquiring a comment character string, which has a distance from the positioning point of the positioning data corresponding to the reproduction time of the video that is in the middle of the reproduction to be a predetermined distance or less, corresponding to the comment coordinate value from a comment storing unit storing comment information in which the comment character string representing a character string displayed during the reproduction of the video and a comment coordinate value representing coordinate information of a capture location at which the comment character string is displayed are associated with each other; and displaying the acquired comment character string on the display screen on which the video is displayed.

According to still another aspect of the present invention, a computer program product comprising a non-transitory computer usable medium having computer readable comment creating-displaying program that causes a computer to execute: acquiring video that is captured during movement and positioning data that is information including positioning time representing time when a capture location of the video is positioned and a positioning point representing coordinate information of the capture location of the video; controlling reproduction of the acquired video; acquiring a comment character string, which has a distance from the positioning point of the positioning data corresponding to the reproduction time of the video that is in the middle of the reproduction to be a predetermined distance or less, corresponding to the comment coordinate value from a comment storing unit storing comment information in which the comment character string representing a character string displayed during the reproduction of the video and a comment coordinate value representing coordinate information of a capture location at which the comment character string is displayed are associated with each other; and displaying the acquired comment character string on the display screen on which the video is displayed.

According to still another aspect of the present invention a computer program product includes a non-transitory computer usable medium having computer readable comment creating-displaying program that causes a computer to further execute: receiving a comment input during the reproduction of the video, acquiring the coordinate information of the capture location corresponding to the reproduction time of the video at the time of inputting the comment, which is estimated based on the positioning time of the positioning data; creating new comment information representing information, including the received comment and the acquired coordinate information of the capture location; setting the comment included in the created new comment information as the comment character string; and storing the coordinate information included in the new comment information in the comment storing unit as the comment coordinate value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram that illustrates an example of information stored in a movement information storing unit according to the first embodiment;

FIG. 3 is a diagram that illustrates an example of information stored in a comment storing unit according to the first embodiment;

DETAILED DESCRIPTION OF THE PREFERRED EMBODIMENTS

Hereinafter, comment creating-displaying devices, methods of creating and displaying a comment, and comment creating-displaying programs according to embodiments of the present invention will be described with reference to the accompanying drawings. However, the following embodiments are not for the purposes of limiting the present invention. In addition, the embodiments may be appropriately combined together in a range in which the contents are not contradictory.

First Embodiment

Figure 1:
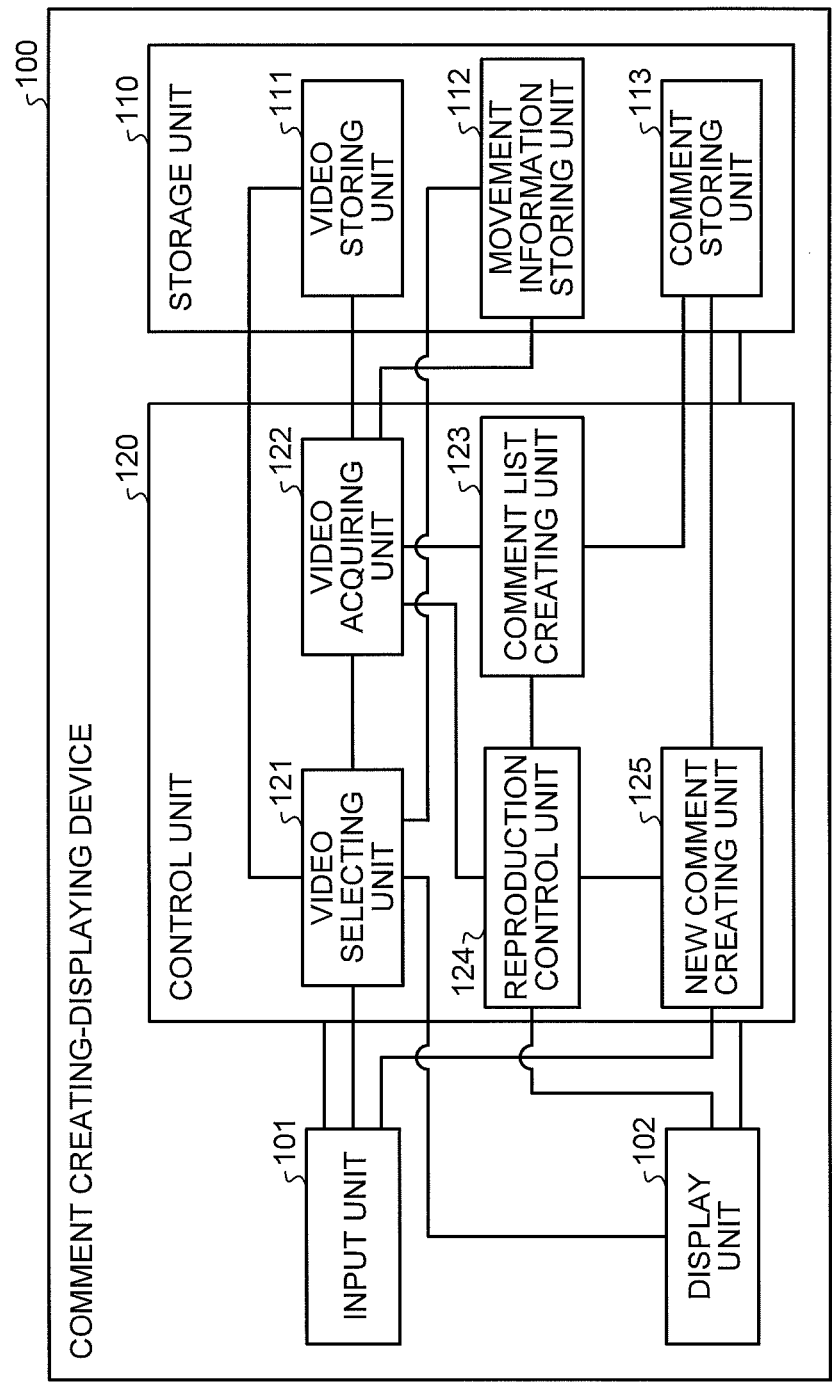
FIG. 1 is a functional block diagram that illustrates an example of the configuration of a comment creating-displaying device according to a first embodiment.

Configuration of Comment Creating-Displaying Device According to First Embodiment The configuration of a comment creating-displaying device according to a first embodiment will be described with reference to FIG. 1. FIG. 1 is a functional block diagram that illustrates an example of the configuration of the comment creating-displaying device according to the first embodiment.

As illustrated in FIG. 1, a comment creating-displaying device 100 includes an input unit 101, a display unit 102, a storage unit 110, and a control unit 120. For example, the comment creating-displaying device 100 is used in a case where video (for example, an on-vehicle moving image), which is captured while a vehicle or the like is moving, is browsed. Video such as on-vehicle moving images is stored in a server device that is connected to the comment creating-displaying device 100 through a network, and a user selects and browses video from a plurality of video items.

The input unit 101 includes a keyboard, a mouse, and the like and receives various kinds of information as input by the user in the comment creating-displaying device 100. The input of various kinds of information may be performed through an operation of a touch panel. The display unit 102 includes a monitor (or a display, a touch panel, or the like) as a display device and a speaker and outputs various kinds of information in the comment creating-displaying device 100. The screen displayed by the display unit 102 is an example of a "display screen".

The storage unit 110 stores data that is necessary for various processes performed by the control unit 120 and results of various processes performed by the control unit 120. The storage unit 110 includes a video storing unit 111, a movement information storing unit 112, and a comment storing unit 113. The storage unit 110 is a semiconductor memory element such as random access memory (RAM), read only memory (ROM), flash memory, or a storage device such as a hard disk, an optical disc etc., for example.

The video storing unit 111 stores video data of video that is captured during movement. More specifically, the video storing unit 111 stores a video ID used for uniquely identifying video captured during movement, video data of video, and metadata representing metadata of video. For example, the metadata is: site information representing capture date and time, a capture place, or the like; a capture device; the quality of a moving image; a codec; a vehicle type; and the like. In a case where video data is digital data, the metadata is generally written in the video data using a format called an exchange image file format (Exif).

The movement information storing unit 112 stores information relating to the capture location and the capture time of video that is captured during movement. More specifically, the movement information storing unit 112 stores: a movement information ID; a video ID; and positioning data including positioning start time, positioning time, and a positioning point. Among these, the movement information ID is information used for uniquely identifying respective information stored in the movement information storing unit 112. The positioning start time is information representing time at which the capturing and the positioning of video are started. The positioning point is information of coordinates measured by a device measuring the location such as a GPS receiver at the capture location. The positioning time is information of time at which the positioning point is measured. In addition, the positioning data is data that is added every time when a GPS signal is received by the GPS receiver. Since video is recorded while a capturing person moves, a plurality pieces of the positioning data are recorded.

FIG. 2 is a diagram that illustrates an example of information stored in the movement information storing unit 112 according to the first embodiment. For example, the movement information storing unit 112 stores: a movement information ID "movement information 1"; a video ID "Movie 1"; positioning start time "02/12/2012 12:00:00"; positioning time "02/12/2012 12:00:00"; and a positioning point "(139.611543, 35.464917)" in association with one another. As described above, a plurality pieces of the positioning data are recorded for one movement information ID. As illustrated in FIG. 2, the positioning point is the latitude and longitude represented in percentages. In other words, a positioning point "(139.611543, 35.464917)" is information that represents 139.611543 degrees east longitude and 35.464917 degrees north latitude.

The comment storing unit 113 stores information relating to a comment that is displayed during the reproduction of video. More specifically, the comment storing unit 113 stores a comment ID, a video ID, a comment character string, and a comment coordinate value. Among these, the comment ID is information that is used for uniquely identifying respective information stored in the comment storing unit 113. In the video ID, a video ID of video that is in the middle of reproduction when information relating to a comment stored in the comment storing unit 113 is created. The comment character string is information that represents a character string of a comment displayed during the reproduction of video and is a comment that may be displayed at a position corresponding to the coordinate value of the comment. The comment coordinate value is information that represents the coordinate information of a capture location at which a comment character string is displayed and is coordinate information (location coordinates) representing the site of a comment corresponding to the comment character string.

FIG. 3 is a diagram that illustrates an example of information stored in the comment storing unit 113 according to the first embodiment. For example, the comment storing unit 113 stores a comment ID "Comment1", a video ID "Movie1", and a comment character string "Ramen of this place is tasty", and a comment coordinate value "(139.612327, 35.465738)" in association with another. As another example, the comment storing unit 113 stores a comment ID "Comment2", a video ID "Movie2", a comment character string "a parents' house of an entertainer A", and a comment coordinate value "(139.611441, 35.465887)" in association with one another.

Here, for convenience of description, while the storage unit 110 is described as being included in the comment creating-displaying device 100, as described above, video and the like may be stored in a server device on a network, and some or all of them may be stored in an external device connected to a network.

The control unit 120 includes an internal memory that is used for storing programs defining various processing sequences or the like and required data. The control unit 120 includes a video selecting unit 121, a video acquiring unit 122, a comment list creating unit 123, a reproduction control unit 124, and a new comment creating unit 125. The control unit 120, for example, is: an integrated circuit such as an application specific integrated circuit (ASIC), and a field programmable gate array (FPGA); or an electronic circuit such as a central processing unit (CPU), and a micro processing unit (MPU).

The video selecting unit 121 allows a user to select video to be reproduced through the input unit 101 and the display unit 102 and receives information of selected video. More specifically, the video selecting unit 121 creates a user interface (UI) used for allowing a user to select video that is a reproduction target based on information stored in the video storing unit 111 and the movement information storing unit 112 and displays the created UI on the display unit 102. Then, the video selecting unit 121 acquires the information of the video selected by the user through the input unit 101.

Figures 4, 5:
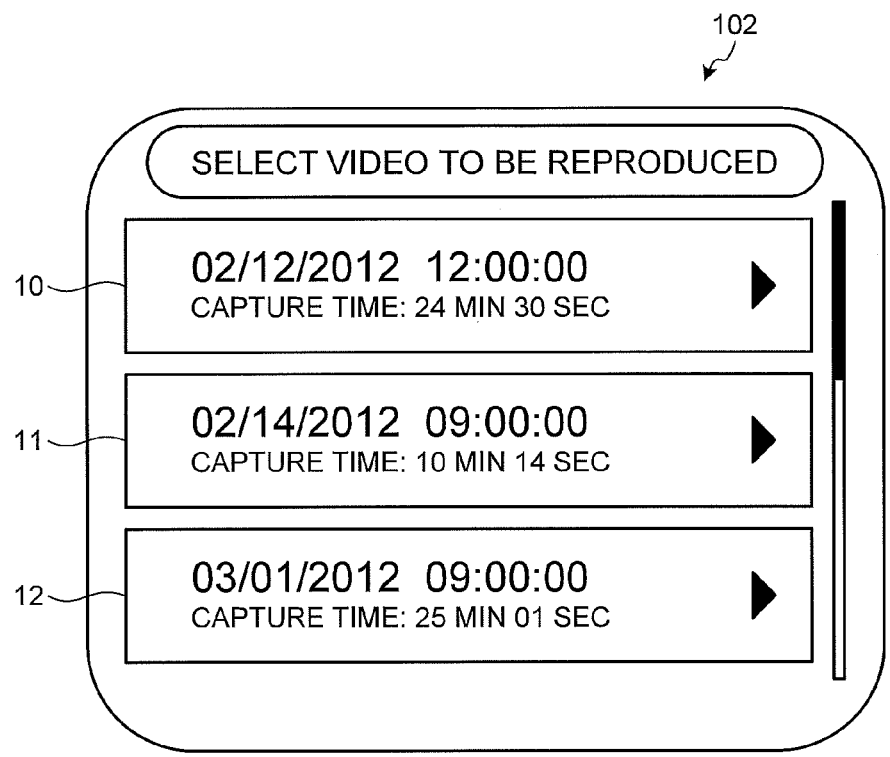
FIG. 4 is a diagram that illustrates an example of a UI provided by a video selecting unit according to the first embodiment.
FIG. 5 is a diagram that illustrates an example of a comment list according to the first embodiment.

FIG. 4 is a diagram that illustrates an example of a UI provided by the video selecting unit 121 according to the first embodiment. As illustrated in FIG. 4, selectable cells 10, 11, and 12 are arranged on the display unit 102. In each cell, in association with each video captured during movement, the capture start time and the capture time of corresponding video are displayed. For example, in the cell 10, information of video of which the capture start time is "02/12/2012 12:00:00" and the capture time "24 minutes and 30 seconds" is displayed. Then, when any one of the cells are selected by the user through the input unit 101, the video selecting unit 121 notifies the video acquiring unit 122 of a video ID corresponding to the selected cell.

The video acquiring unit 122 acquires video captured during movement and positioning data. The video acquiring unit 122 is an example of a "first acquisition unit". More specifically, the video acquiring unit 122 acquires video data of the video corresponding to the video ID, which has been notified of from the video selecting unit 121, from the video storing unit 111. In addition, the video acquiring unit 122 acquires positioning data, which is information including the positioning time and the positioning point of the video corresponding to the video ID notified of from the video selecting unit 121, from the movement information storing unit 112. Then, the video acquiring unit 122 outputs the acquired video data to the reproduction control unit 124 and notifies the comment list creating unit 123 of the acquired positioning data.

The comment list creating unit 123 creates a list of comment character strings displayed at the time of reproducing video based on the positioning data notified of from the video acquiring unit 122 and the information stored in the comment storing unit 113. The list may be referred to as a "comment list". Here, the comment list creating unit 123 is an example of a "second acquisition unit". More specifically, the comment list creating unit 123 calculates a distance between each positioning point of the positioning data notified of from the video acquiring unit 122 and a corresponding comment coordinate value stored in the comment storing unit 113. Then, the comment list creating unit 123 creates a comment list that is acquired by listing comment character strings corresponding to comment coordinate values for which the calculated distance is a predetermined distance or less.

The predetermined distance, for example, is a distance of 50 meters to 100 meters. When the predetermined distance is restricted to a too short distance, there is a possibility that a comment originally desirable to be displayed is not displayed due to a factor such as a road width, GPS precision, or a movement speed. The comment list, for example, is data in which relative reproduction time of video to be reproduced and a comment character string are associated with each other. The relative reproduction time represents reproduction time in a case where the capture start time of video is set to zero seconds and may be derived by taking a difference between the positioning time of the positioning data and the positioning start time acquired by the video acquiring unit 122.

FIG. 5 is a diagram that illustrates an example of the comment list according to the first embodiment. For example, in the comment list, relative reproduction time "00:00:12 (12 seconds)" and a comment character string "The curve here has bad visibility" are associated with each other. As another example, in the comment list, relative reproduction time "00:01:50 (1 minute 50 seconds)" and a comment character string "An island is visible when the weather is good" are associated with each other. As described above, comment character strings corresponding to comment coordinate values having the distance from the positioning point of the positioning data to be less than a predetermined distance are added to the comment list, and accordingly, there are cases where a plurality of comment character strings are present for one relative reproduction time. In addition, in a case where only one comment character string is displayed for one relative reproduction time, out of comment coordinate values of a predetermined distance or less, only a comment character string corresponding to a comment coordinate value of which the distance from the positioning point is minimal may be added to the comment list.

The reproduction control unit 124 controls the reproduction of video that is captured during movement. More specifically, the reproduction control unit 124 controls the display of video data, which is output from the video acquiring unit 122, on the display unit 102. At this time, the reproduction control unit 124 displays a comment character string on the display screen in accordance with relative reproduction time based on the comment list created by the comment list creating unit 123. In addition, the reproduction control unit 124 displays a UI used for allowing a user to add a new comment on the display unit 102.

Figure 6:
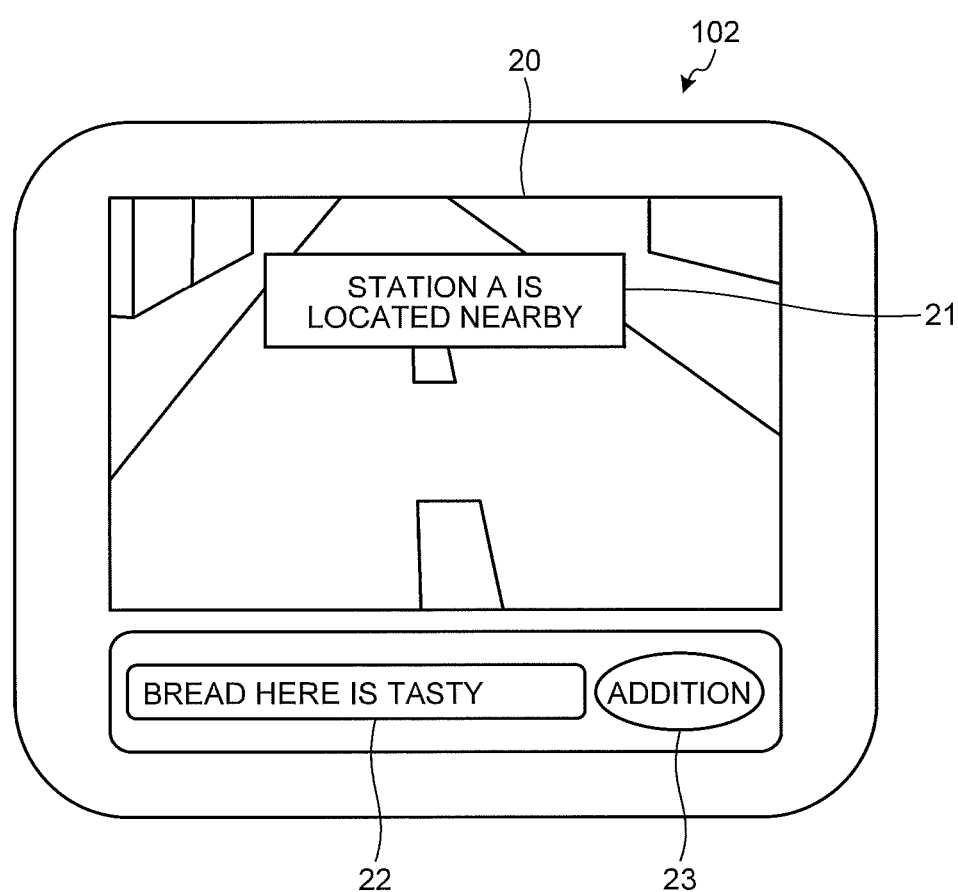
FIG. 6 is a diagram that illustrates an example of a reproduction screen of a video according to the first embodiment.

FIG. 6 is a diagram that illustrates an example of a reproduction screen of video according to the first embodiment. As illustrated in FIG. 6, on the display unit 102, a video reproduction area 20, a comment display area 21, a comment input area 22, and a comment addition button 23 are displayed. Among these, the video reproduction area 20 is an area in which video that is in the middle of reproduction is displayed. The comment display area 21 is an area in which comment character strings included in the comment list are displayed in accordance with the reproduction time of video. For example, in a case where the reproduction time of video coincides with relative reproduction time of any one of comment character strings recorded in the comment list, the reproduction control unit 124 displays a corresponding comment character string in the comment display area 21 for a predetermined time. The predetermined time, for example, is a time of five seconds. FIG. 6 illustrates an example in which the display of a comment character string overlaps a video that is in the middle of reproduction. On the display screen, the comment character string may not overlap the video that is in the middle of reproduction. For example, the comment character string may be displayed outside the video.

The comment input area 22 is a control component to which a character string is input. A comment character string is input to the comment input area 22 through the input unit 101 by a user. In the example illustrated in FIG. 6, a comment character string "The bread here is tasty" is input to the comment input area 22. The comment addition button 23 is a control component that is used for adding a character string input to the comment input area 22 as a new comment. In a case where the comment addition button 23 is pressed by the user, the reproduction control unit 124 outputs the video ID of video at the time of pressing the button, a reproduction time, and a comment coordinate value to the new comment creating unit 125. The comment coordinate value is set by referring to a positioning point (the coordinate information of the capture location) corresponding to the reproduction time. In addition, in the case where the comment addition button 23 is pressed by the user, the input unit 101 outputs the input comment character string to the new comment creating unit 125.

Here, the reproduction time and the comment coordinate value output to the new comment creating unit 125 may not be those at the time of pressing the comment addition button 23 but may be those at the time of inputting a character string to the comment input area 22. More specifically, since a certain amount of time is required for inputting a character string, the reproduction time and the comment coordinate value at a time point at which the character string is input are used. In other words, the reproduction control unit 124 acquires the reproduction time and the comment coordinate value at a time point at which the character string is input to the comment input area 22 and outputs the reproduction time and the comment coordinate value, which have been acquired, to the new comment creating unit 125 when the comment addition button 23 is pressed. At this time, the reproduction control unit 124 may temporarily stop video, which is in the middle of reproduction, at a time point at which the character string is input to the comment input area 22.

The new comment creating unit 125 creates new comment information and stores the created new comment information in the comment storing unit 113. More specifically, the new comment creating unit 125 receives the comment character string input through the input unit 101 and receives the video ID, the reproduction time, and the comment coordinate value output by the reproduction control unit 124. Then, the new comment creating unit 125 stores the comment character string, the video ID, the reproduction time, and the comment coordinate value, which have been received, in the comment storing unit 113.

Here, the setting of a comment coordinate value of the new comment information will be described in detail. A positioning point of positioning data at which a difference between the positioning start time corresponding to the video ID of video that is in the middle of reproduction and the positioning time is the same as the reproduction time of the video that is in the middle of reproduction is acquired, and the acquired positioning point is set as a comment coordinate value. Described with reference to FIG. 2 as an example, in a case where the video ID of video that is in the middle of reproduction is "Movie1", and the reproduction time is "00:00:03", a difference between the positioning start time and the positioning time is three seconds at positioning time "02/12/2012 12:00:03" when three seconds elapse from the positioning start time "02/12/2012 12:00:00". From this, a positioning point "(139.611747, 35.465135)" corresponding to the positioning time "02/12/2012 12:00:03" is set as a comment coordinate value.

However, in a case where positioning time coinciding with the reproduction time is not present, a positioning point is calculated by performing a linear interpolation process. Described with reference to FIG. 2 as an example, in a case where the video ID of video that is in the middle of reproduction is "Movie1" and the reproduction time is "00:00:02", data for which a difference between the positioning start time and the positioning time is two seconds is not present. Accordingly, a linear interpolation process is performed by using positioning data of which the positioning time is "02/12/2012 12:00:00" and positioning data of which the positioning time is "02/12/2012 12:00:03". When the positioning point is acquired through a linear interpolation represented in Numerical Expression (1), the acquired positioning point is set as a comment coordinate value.

$$\left(\frac{139.611543 + 139.611747 \times 2}{3}, \frac{35.464917 + 35.465135 \times 2}{3}\right) = \quad (1)$$
$$(139.611679, 35.465062)$$

Entire Process Flow According to First Embodiment

Figure 7:
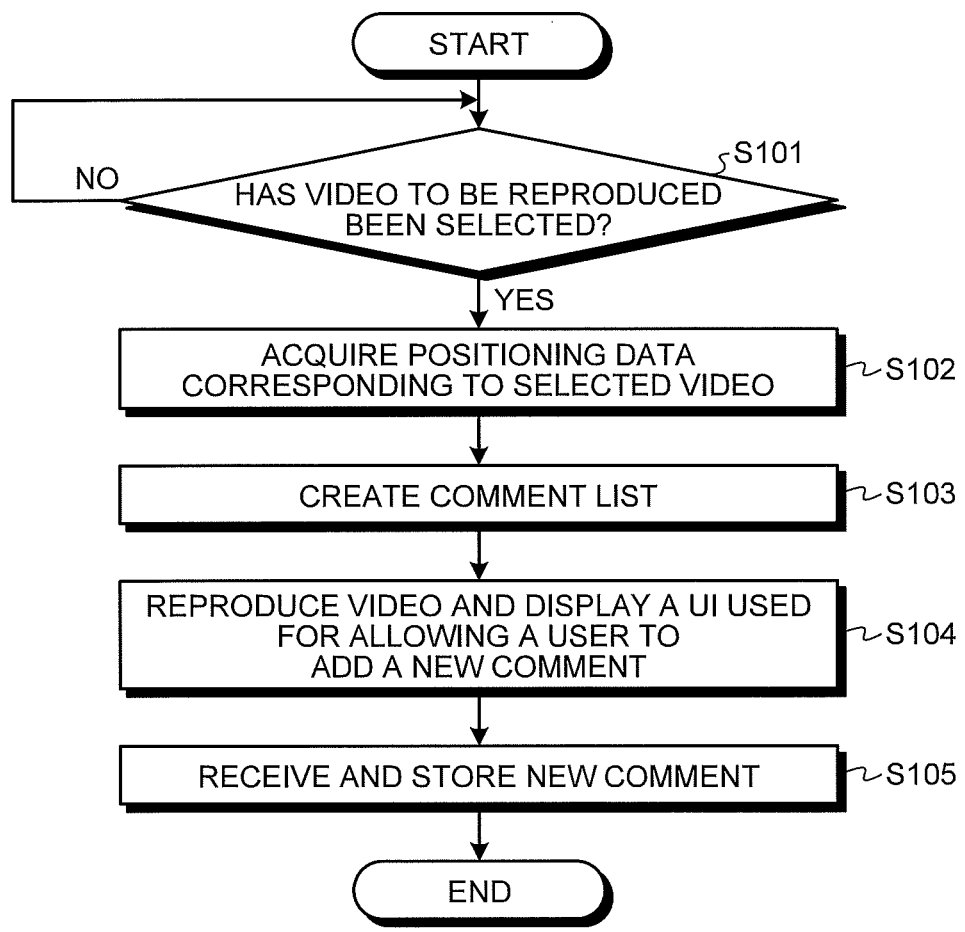
FIG. 7 is a flowchart that illustrates an example of the flow of the entire process performed in the comment creating-displaying device according to the first embodiment.

Next, the entire process flow performed in the comment creating-displaying device 100 according to the first embodiment will be described with reference to FIG. 7. FIG. 7 is a flowchart that illustrates an example of the flow of the entire process performed in the comment creating-displaying device 100 according to the first embodiment.

As illustrated in FIG. 7, in a case where video to be reproduced has been selected from a UI used for allowing a user to select to video that is a reproduction target, which is created by the video selecting unit 121 and is displayed on the display unit 102, (Yes in Step S101); the video acquiring unit 122 acquires video data corresponding to the video ID of the selected video from the video storing unit 111 and acquires positioning data including positioning time and a positioning point from the movement information storing unit 112 in Step S102. On the other hand, in a case where video to be reproduced has not been selected (No in Step S101), the video acquiring unit 122 is in a state waiting for the selection of video to be reproduced.

The comment list creating unit 123 calculates distances between each positioning point of the positioning data acquired by the video acquiring unit 122 and comment coordinate values stored in the comment storing unit 113; and creates a comment list acquired by listing comment character strings corresponding to the comment coordinate values for which the calculated distances are a predetermined distance or less in Step S103. The reproduction control unit 124 controls the display of the video of the video data acquired by the video acquiring unit 122 on the display unit 102 based on the comment list created by the comment list creating unit 123 and displays the comment character string on the display screen, thereby displaying a UI used for allowing a user to add a new comment on the display unit 102 in Step S104. The new comment creating unit 125 receives: the input comment character string; receives the video ID; the reproduction time; and the comment coordinate value from the reproduction control unit 124, and stores: the comment character string; the video ID; the reproduction time; and the comment coordinate value, which have been received, in the comment storing unit 113 in Step S105.

Flow of Comment List Generating Process According to First Embodiment

Figure 8:
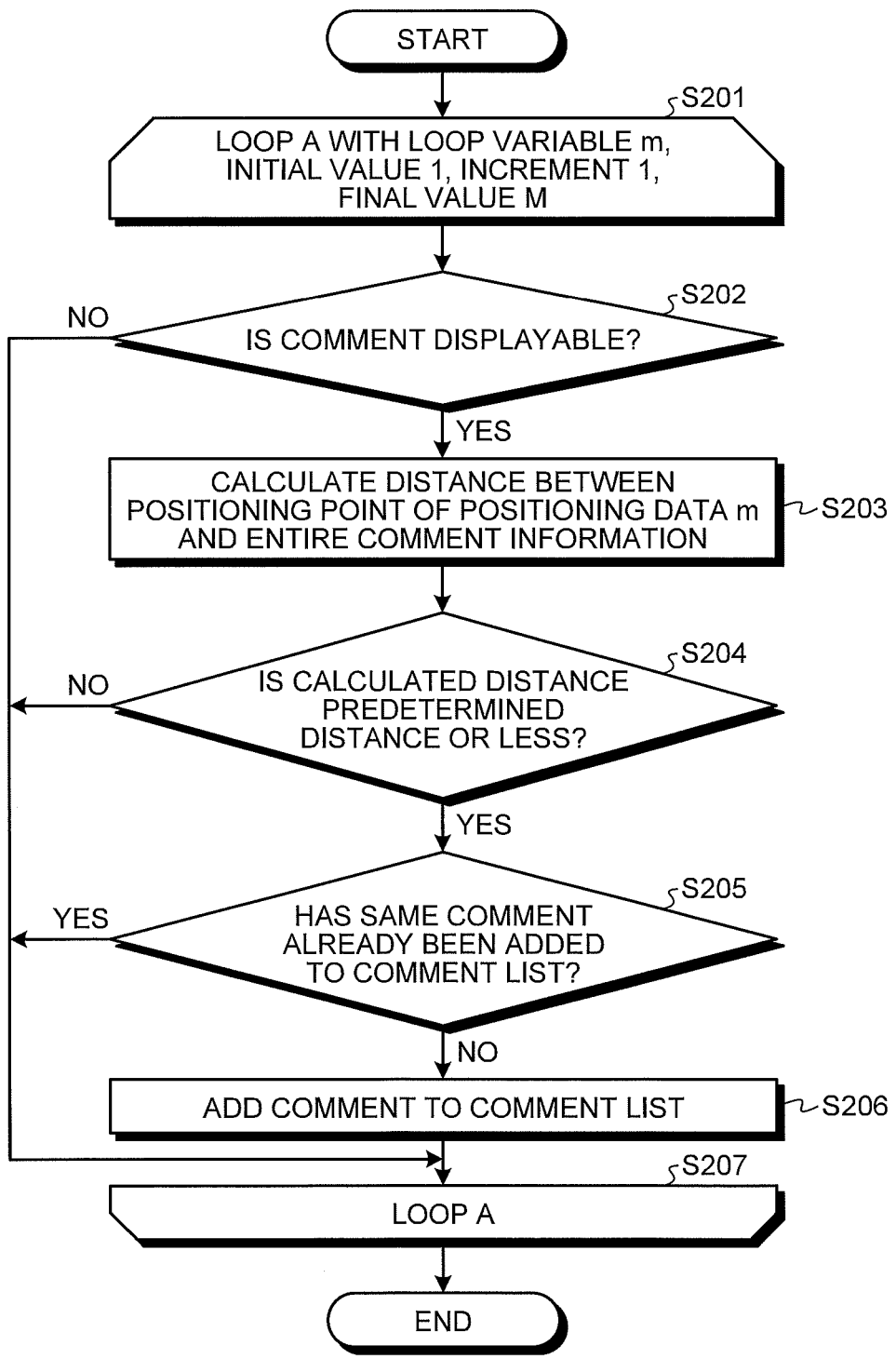
FIG. 8 is a flowchart that illustrates an example of the flow of a comment list creating process according to the first embodiment.

Next, the flow of a comment list creating process according to the first embodiment will be described with reference to FIG. 8. FIG. 8 is a flowchart that illustrates an example of the flow of the comment list creating process according to the first embodiment. The comment list creating process according to the first embodiment mainly represents a process performed by the comment list creating unit 123.

As illustrated in FIG. 8, the comment list creating unit 123 sets the number of units of the positioning data acquired by the video acquiring unit 122 to "M" and starts looping a loop A with an initial value of "1" and an increment of "1" until a loop variable "m" becomes a final value "M" in Step S201. Hereinafter, the m-th positioning data may be referred to as "positioning data m".

Then, the comment list creating unit 123 determines whether or not a difference between relative time acquired from the positioning time of the positioning data m and relative reproduction time corresponding to the comment character string that has been added to the comment list last is a display time of the comment character string or more, thereby determining whether or not the comment character string is displayable in Step S202. As a method for acquiring relative time based on the positioning time of the positioning data m, a difference between the positioning start time acquired by the video acquiring unit 122 and the positioning time of the positioning data m may be acquired. As described above, the display time of the comment character string, for example, is five seconds, and accordingly, the comment list creating unit 123 determines that the comment character string is displayable in a case where there are five seconds or more to spare.

At this time, in a case where the comment character string is determined to be displayable (Yes in Step S202), the comment list creating unit 123 calculates distances between the positioning point of the positioning data m and all the comment coordinate values stored in the comment storing unit 113 in Step S203. In a case where the positioning point of the positioning data m and the comment coordinate value are represented as latitude and longitude in percentages, an approximate distance "D" between two points may be acquired using Numerical Expression (2) when the positioning point of the positioning data m is $(x_1, y_1)$, and the comment coordinate value is $(x_2, y_2)$. In Numerical Expression (2), the unit of the distance "D" is meters.

$$D = \frac{\sqrt{(x_1 - x_2)^2 + (y_1 - y_2)^2}}{360} \times 40009152 \quad (2)$$

Subsequently, the comment list creating unit 123 determines whether the calculated distance is a predetermined distance or less in Step S204. In a case where the calculated distance is determined to be the predetermined distance or less (Yes in Step S204), the comment list creating unit 123 determines whether or not the same comment character string as a comment character string corresponding to a comment coordinate value having a distance from the positioning point of the positioning data m being less than a predetermined distance has already been added to the comment list in Step S205. At this time, in a case where it is not determined that the same comment character string has already been added to the comment list (No in Step S205), the comment list creating unit 123 adds relative reproduction time of video data calculated based on the positioning data m and the comment character string to the comment list in Step S206.

Thereafter, in a case where the loop variable m satisfies the end condition of the loop A in Step S207, the comment list creating unit 123 ends the process. On the other hand, in a case where the end condition is not satisfied, the comment list creating unit 123 returns the process to Step S201 and performs the above-described process. In other words, in a case where it is determined that the comment is not displayable (No in Step S202); in a case where the calculated distance is longer than the predetermined distance (No in Step S204); and, in a case where the same comment character string has already been added to the comment list (Yes in Step S205); the comment list creating unit 123 performs the above-described process until the loop variable m satisfies the end condition of the loop A.

Effects of First Embodiment

As described above, since the comment creating-displaying device 100 acquires the location corresponding to video based on the reproduction time, a comment corresponding to the location that corresponds to the video that is in the middle of reproduction can be displayed. By reading a comment corresponding to the location that is currently reproduced in the video, a user can easily acquire the relation between actual surrounding video and the comment. In addition, since a comment corresponding to each location that corresponds to video, which is in the middle of reproduction, is maintained, for example, a comment character string can be displayed in another moving image based on the comment coordinate value, and a comment character string can be displayed in an arbitrary map service.

In addition, as a user browses video and inputs a comment, the comment creating-displaying device 100 can maintain the comment for the input site, and accordingly, the comment can be maintained in association with the location information even when an accurate coordinate value of a site desired to be commented on is not recognized by the user. Since it is possible to easily maintain comments in association with the location information, for example, a comment character string can be displayed in another moving image based on the location information (comment coordinate value), and a comment character string can be displayed in an arbitrary map service.

Modified Example of First Embodiment

Figure 9:
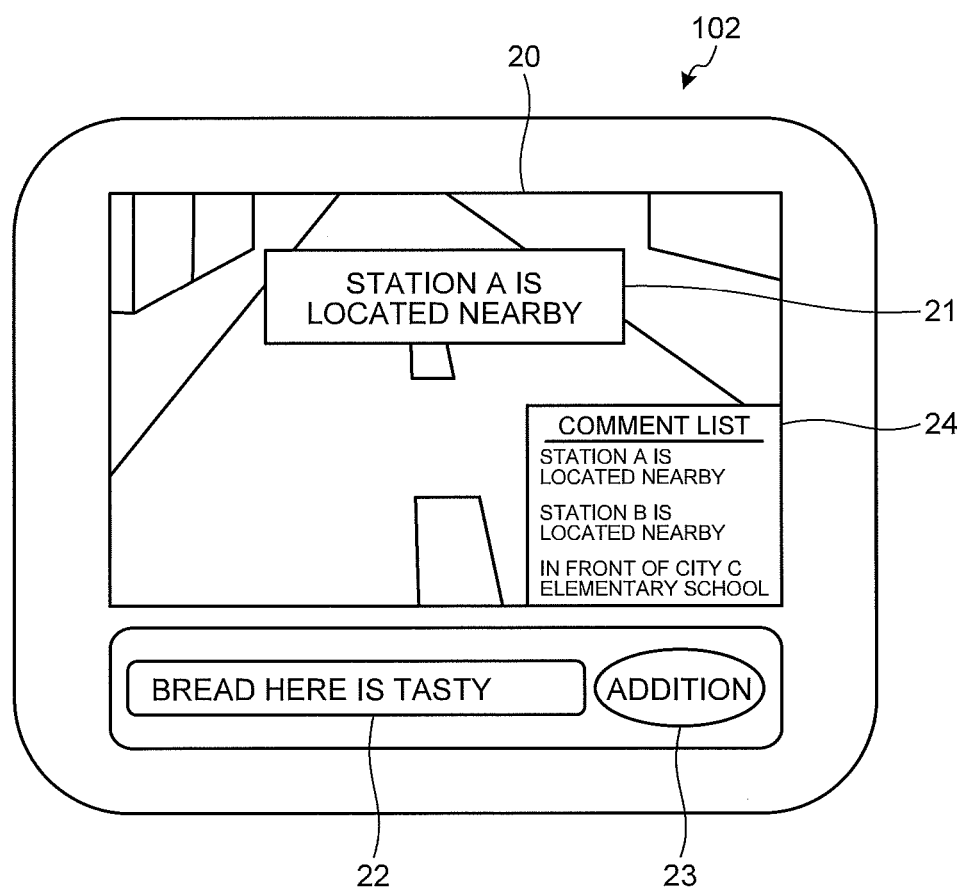
FIG. 9 is a diagram that illustrates an example of a reproduction screen of video according to a modified example of the first embodiment.

FIG. 9 is a diagram that illustrates an example of a reproduction screen of video according to a modified example of the first embodiment. In the example illustrated in FIG. 9, a comment list 24 is displayed, which is different from the example illustrated in FIG. 6. More specifically, in a case where one is selected from comment character strings included in the comment list 24 by a user, the reproduction control unit 124 seeks for a reproduction position of video at a position corresponding to the selected comment character string. Hereinafter, the process performed in a case where the reproduction position of video is sought for at a position corresponding to the comment character string selected from the comment list 24 will be described.

The comment list creating unit 123 further creates the comment list 24 representing data acquired by combining each comment character string and positioning time corresponding to the comment character string separately from the comment list. From this, the reproduction control unit 124 displays comment character strings included in the comment list 24 created by the comment list creating unit 123 on the display screen (see FIG. 9). Thereafter, in a case where any one of the comment character strings included in the comment list 24 is selected, the reproduction control unit 124 controls the reproduction of video corresponding to the positioning point of the positioning time of the selected comment character string, thereby seeking for a reproduction position of the video at a position corresponding to the comment character string selected from the comment list 24.

In addition, the comment list creating unit 123 may add the video ID and the comment ID to the comment list 24. From this, in a case where one of comment character strings is selected from the comment list 24, the reproduction control unit 124 may switch the video to be reproduced to video of the video ID corresponding to the selected comment character string. In a case where the video that is reproduced is changed, when the reproduction of video corresponding to a new video ID is started, the reproduction control unit 124 acquires a comment ID from the comment list creating unit 123 and changes the reproduction position to relative reproduction time of a comment character string having the comment ID coinciding with the acquired comment ID, thereby being able to reproduce the video from a position corresponding to the selected comment character string.

Second Embodiment

In the first embodiment described above, the case has been described in which a comment for the location corresponding to video that is in the middle of reproduction is added. In a second embodiment, a case will be described in which the display position of a comment is set when the comment for the location corresponding to the video that is in the middle of reproduction is added.

More specifically, in the second embodiment, in a case where a comment is input, direction information is added by setting the display position of the comment displayed on the display screen. In addition, in the second embodiment, the display/non-display of the comment is controlled based on the added direction information. For example, even in a case where a comment for Mt. Fuji is input to video from Tokyo toward Shizuoka, Mt. Fuji is not projected on video from Shizuoka toward Tokyo, and accordingly, there is a case where it is undesirable to display the input comment even at the same location.

Figure 10:
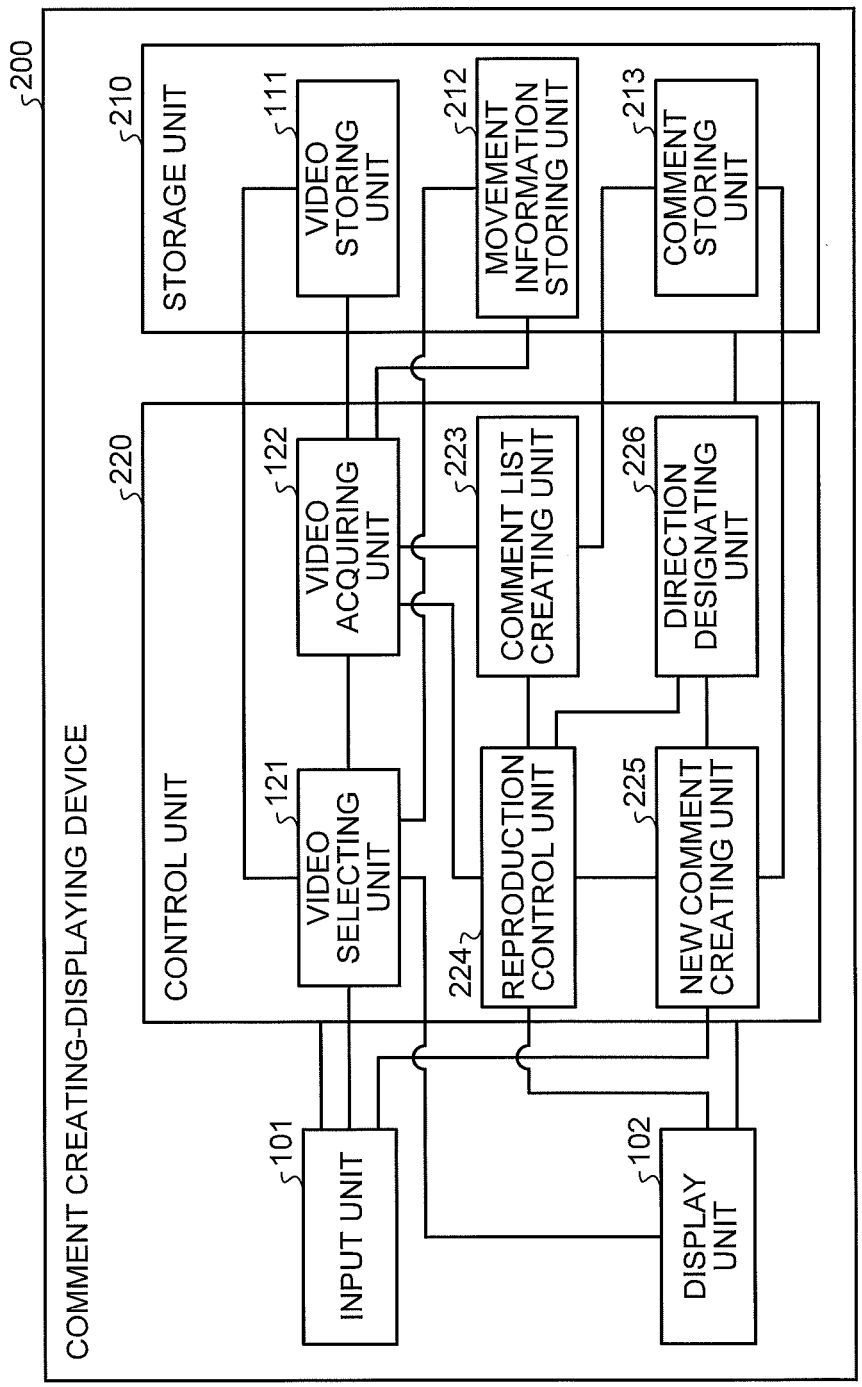
FIG. 10 is a functional block diagram that illustrates an example of a comment creating-displaying device according to a second embodiment.

Configuration of Comment Creating-Displaying Device According to Second Embodiment The configuration of a comment creating-displaying device according to the second embodiment will be described with reference to FIG. 10. FIG. 10 is a functional block diagram that illustrates an example of the configuration of the comment creating-displaying device according to the second embodiment. In FIG. 10, the same reference numeral is assigned to the same configuration as that of the comment creating-displaying device 100 according to the first embodiment, and detailed description of the same configuration may be omitted. In the second embodiment, the functions, the configurations, and the processes of units excluding a movement information storing unit 212 and a comment storing unit 213 of a storage unit 210 and a comment list creating unit 223, a reproduction control unit 224, a new comment creating unit 225, and a direction designating unit 226 of a control unit 220 are the same as those of the first embodiment.

As illustrated in FIG. 10, a comment creating-displaying device 200 includes an input unit 101, a display unit 102, the storage unit 210, and the control unit 220. The storage unit 210 includes a video storing unit 111, the movement information storing unit 212, and the comment storing unit 213. The control unit 220 includes a video selecting unit 121, a video acquiring unit 122, the comment list creating unit 223, the reproduction control unit 224, the new comment creating unit 225, and the direction designating unit 226.

The movement information storing unit 212 stores a video ID, positioning start time, and positioning data in association with a movement information ID. In such positioning data, in addition to positioning time and a positioning point, capture direction information that represents a direction at the time of capturing video is included. In other words, the positioning data according to the second embodiment is a combination of positioning time, a positioning point, and capture direction information. In the capture direction information, a numerical value representing the direction is stored. For example, a degree measure is used in which the north is represented by 0 degree, and one circle in the clockwise direction is represented by 360 degrees. In other words, the true east is represented by 90 degrees, the true south is represented by 180 degrees, and the true west is represented by 270 degrees. A numerical value representing the direction may be represented not by using the degree measure but by using a circular measure, and the reference of zero degree may be changed to any other direction such as the south other than the north.

The comment storing unit 213 stores a video ID, a comment character string, a comment coordinate value, and a comment direction in association with a comment ID. The comment direction is information that represents the display position of the comment character string on the display screen. In the comment direction, similarly to the capture direction information, a numerical value representing the direction is stored.

The comment list creating unit 223 creates a comment list based on the positioning data notified of from the video acquiring unit 122 and information stored in the comment storing unit 213. More specifically, the comment list creating unit 223 calculates a distance between each positioning point of the positioning data notified of from the video acquiring unit 122 and the comment coordinate value stored in the comment storing unit 213. Then, the comment list creating unit 223 creates a comment list that is acquired by listing comment character strings corresponding to comment coordinate values for which the calculated distances are a predetermined distance or less. At this time, the comment list creating unit 223 calculates a display angle at the time of displaying a comment character string on the display screen by using the capture direction information of the positioning data.

When the capture direction information of the positing data m is "$\theta_m$", and the comment direction is "$\theta_c$", the display angle "$\theta$" is acquired by using Numerical Expression (3). From these, the comment list creating unit 223 creates a comment list that further includes the acquired display angle.

$$\theta = (\theta_c + 360 - \theta_m) \bmod 360 \tag{3}$$

The reproduction control unit 224 controls the reproduction of video that is captured during movement. More specifically, the reproduction control unit 224 controls the display of video data output from the video acquiring unit 122 and displayed on the display unit 102. At this time, the reproduction control unit 224 displays the comment character string in accordance with the relative reproduction time and the display angle based on the comment list created by the comment list creating unit 223. In the display of the comment character string according to the display angle, when the display angle is 315 degrees or more and less than 360 degrees or is zero degrees or more and less than 45 degrees; and when the display angle is "$\theta$", the width of the video is "w", and the width of the comment character string is "wc"; the reproduction control unit 224 calculates an x coordinate value "xc" of the comment display area 21 by using Numerical Expression (4). From these, the reproduction control unit 224 changes the coordinate value of the upper left side of the comment display area 21 to the x coordinate calculated by using Numerical Expression (4) and displays the comment character string on the display screen. In other words, the comment character string displayed on the display screen is superimposed on the video. However, the comment character string may not be superimposed on the video but may be displayed outside the video, and the calculated coordinate position may be indicated using an object such as an arrow. In addition, in a case where the display angle is 45 degrees or more and less than 315 degrees, the reproduction control unit 224 determines that a target object corresponding to the comment character string is located outside the video and does not allow the comment character string to be displayed in the comment display area 21. In addition, the reproduction control unit 224, similarly to the reproduction control unit 124, displays a UI used for allowing a user to add a new comment on the display unit 102. Here, the x coordinate value of the comment display area 21 is an example of a "comment position".

$$x_c = \frac{(\theta + 45) \bmod 360}{90}(w - w_c) \tag{4}$$

Figure 11:
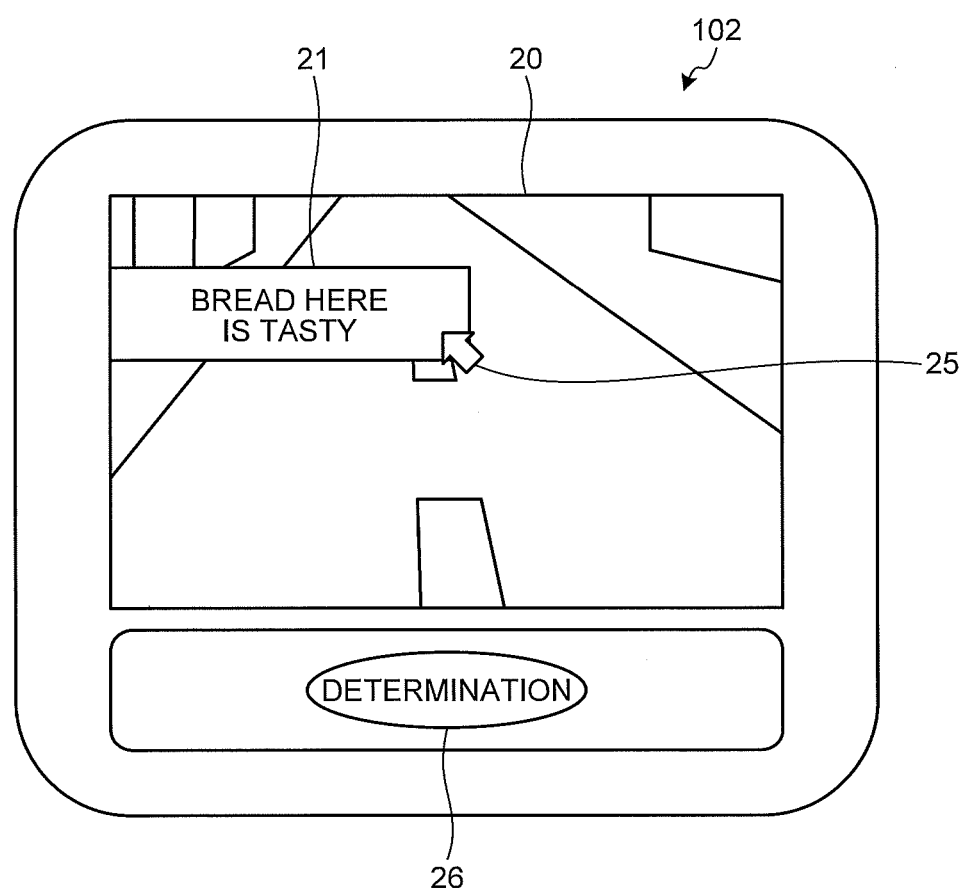
FIG. 11 is a diagram that illustrates an example of a reproduction screen of video according to the second embodiment.

FIG. 11 is a diagram that illustrates an example of the reproduction screen of video according to the second embodiment. As illustrated in FIG. 11, a video reproduction area 20, the comment display area 21, a cursor pointer 25, and a determination button 26 are displayed on the display unit 102. FIG. 11 illustrates an example in which a character string "The bread here is tasty" input into the comment input area 22 is displayed in the comment display area 21. In other words, the comment display area 21 illustrated in FIG. 11 is responsible for the role of previewing a character string input into the comment input area 22.

A user moves the comment display area 21 as a preview to a desired display position by operating the cursor pointer 25 and presses the determination button 26. In detail, the user moves the comment display area 21 as a preview in a direction of the target object corresponding to the character string. When the determination button 26 is pressed, the reproduction control unit 224 outputs: the video ID of video at the time of pressing the button; the reproduction time; and the comment coordinate value to the new comment creating unit 225. In addition, in the case where the determination button 26 is pressed by a user, the reproduction control unit 224 outputs: the x coordinate value "$x_c$" of the comment display area 21 as a preview; the width "w" of the video; and the width "$w_c$" of the comment character string; to the direction designating unit 226. Furthermore, in the case where the determination button 26 is pressed by the user, the input unit 101 outputs the input comment character string to the new comment creating unit 225.

The direction designating unit 226 acquires a comment direction "$\theta_c$" based on the x coordinate value "$x_c$" of the comment display area 21, the width "w" of the video, and the width "$w_c$" of the comment character string output from the reproduction control unit 224. More specifically, the direction designating unit 226 acquires a comment direction "$\theta_c$" using Numerical Expression (5) and outputs the acquired comment direction "$\theta_c$" to the new comment creating unit 225.

$$\theta_c = \left(\frac{90\, x_c}{w - w_c} + 315\right) \bmod 360 \quad (0 \le x_c \le w - w_c) \tag{5}$$

The new comment creating unit 225 creates new comment information and stores the created new comment information in the comment storing unit 213. More specifically, the new comment creating unit 225 receives a comment character string input through the input unit 101 and receives a video ID, a reproduction time, and a comment coordinate value output from the reproduction control unit 224. In addition, the new comment creating unit 225 receives a comment direction "$\theta_c$" output from the direction designating unit 226. Then, the new comment creating unit 225 stores the comment character string, the video ID, the reproduction time, the comment coordinate value, and the comment direction, which have been received, in the comment storing unit 213.

Entire Process Flow According to Second Embodiment

Figure 12:
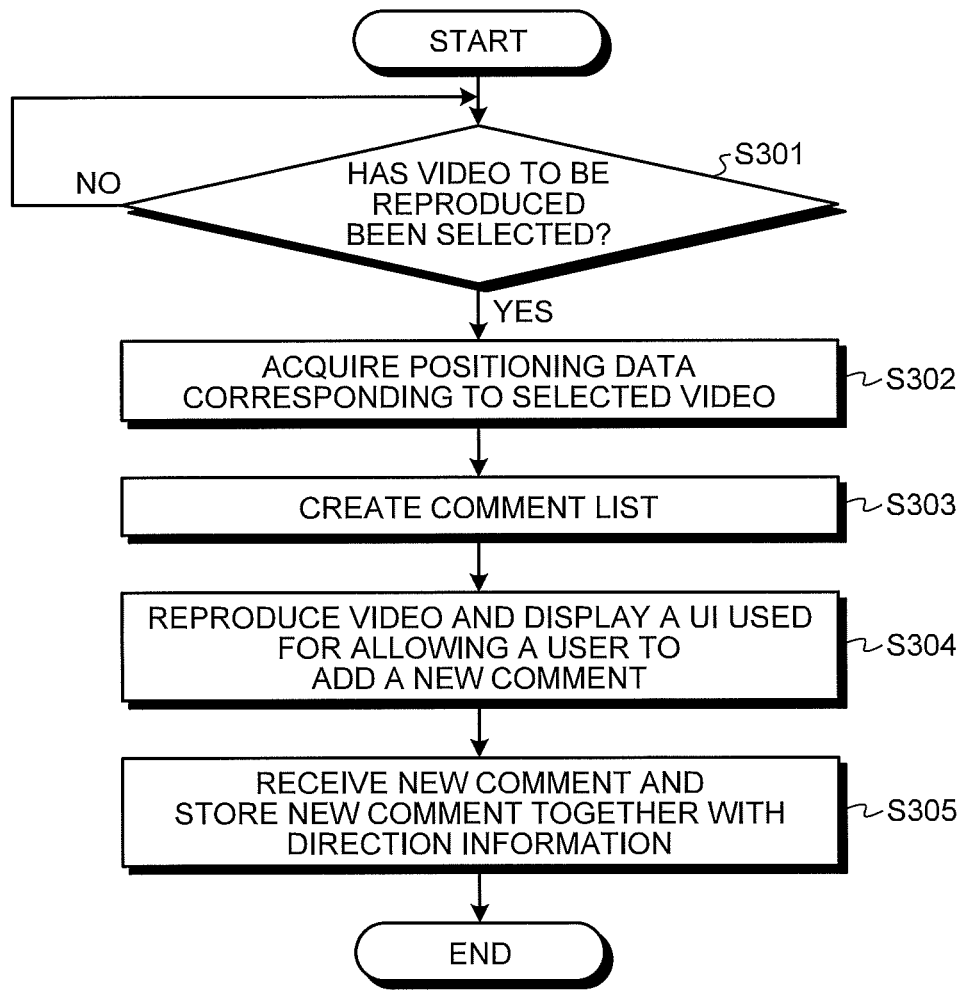
FIG. 12 is a flowchart that illustrates an example of the flow of the entire process performed in the comment creating-displaying device according to the second embodiment.

Next, the entire process flow performed in the comment creating-displaying device 200 according to the second embodiment will be described with reference to FIG. 12. FIG. 12 is a flowchart that illustrates an example of the flow of the entire process performed in the comment creating-displaying device 200 according to the second embodiment.

As illustrated in FIG. 12, in a case where video to be reproduced has been selected in the UI used for allowing a user to select video that is a reproduction target, which is created by the video selecting unit 121 and is displayed on the display unit 102, (Yes in Step S301); the video acquiring unit 122 acquires video data corresponding to the video ID of the selected video from the video storing unit 111 and acquires positioning data including the positioning time, the positioning point, and the capture direction information from the movement information storing unit 212 in Step S302. On the other hand, in a case where video to be reproduced has not been selected (No in Step S301), the video acquiring unit 122 is in a state waiting for the selection of video to be reproduced.

The comment list creating unit 223: calculates distances between each positioning point of the positioning data acquired by the video acquiring unit 122 and comment coordinate values stored in the comment storing unit 213; calculates display angles of the comment character strings using the capture direction information and the comment direction included in the positioning data; and creates a comment list including comment character strings corresponding to the comment coordinate values for which the calculated distances are a predetermined distance or less and the display angles in Step S303.

The reproduction control unit 224 controls the display of video of the video data acquired by the video acquiring unit 122 on the display unit 102 based on the comment list created by the comment list creating unit 223 and displays a comment character string on the display screen in accordance with the display angle, thereby displaying a UI used for allowing a user to add a new comment on the display unit 102 in Step S304. Here, the direction designating unit 226 acquires a comment direction based on the x coordinate value of the comment display area 21, the width of the video, and the width of the comment character string that have been received from the reproduction control unit 224 and outputs the acquired comment direction to the new comment creating unit 225. The new comment creating unit 225: receives the input comment character string; receives the video ID, the reproduction time, and the comment coordinate value from the reproduction control unit 224; receives the comment direction from the direction designating unit 226; and stores the comment character string, the video ID, the reproduction time, the comment coordinate value, and the comment direction, which have been received, in the comment storing unit 213 in Step S305.

Flow of Comment List Creating Process According to Second Embodiment

Figure 13:
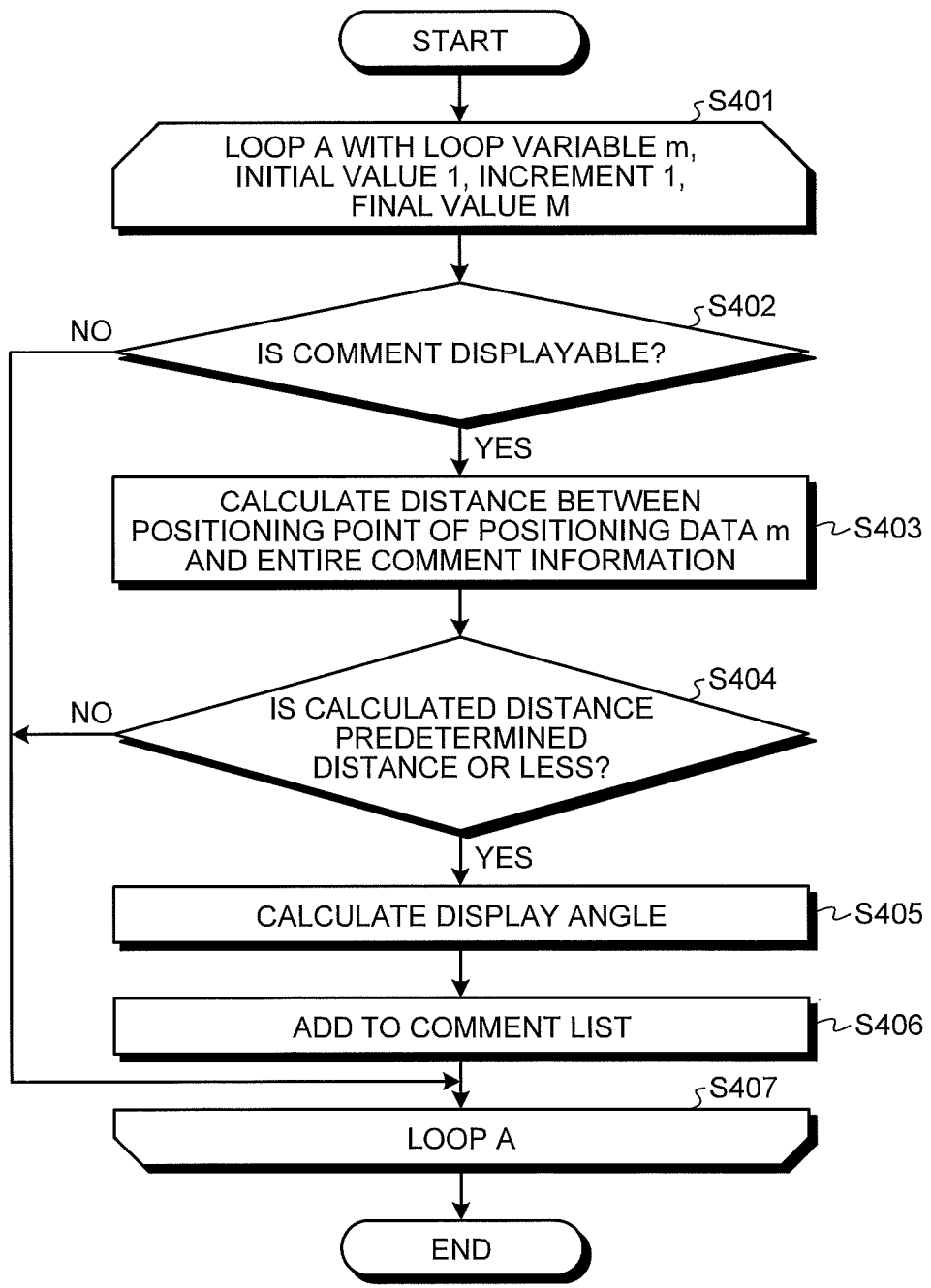
FIG. 13 is a flowchart that illustrates an example of the flow of a comment list creating process according to the second embodiment.

Next, the flow of a comment list creating process according to the second embodiment will be described with reference to FIG. 13. FIG. 13 is a flowchart that illustrates an example of the flow of the comment list creating process according to the second embodiment. The comment list creating process according to the second embodiment mainly represents a process performed by the comment list creating unit 223.

As illustrated in FIG. 13, the comment list creating unit 223 sets the number of units of the positioning data acquired by the video acquiring unit 122 to "M" and starts looping a loop A with an initial value of "1" and an increment of "1" until a loop variable "m" becomes a final value "M" in Step S401. Hereinafter, the m-th positioning data may be referred to as "positioning data m".

Then, the comment list creating unit 223 determines whether or not a difference between relative time acquired from the positioning time of the positioning data m and relative reproduction time corresponding to the comment character string that has been added to the comment list last is a display time of the comment character string or more, thereby determining whether or not the comment character string is displayable in Step S402. At this time, in a case where the comment character string is determined to be displayable (Yes in Step S402), the comment list creating unit 223 calculates distances between the positioning point of the positioning data m and all the comment coordinate values stored in the comment storing unit 213 in Step S403.

Subsequently, the comment list creating unit 223 determines whether the calculated distance is a predetermined distance or less in Step S404. In a case where the calculated distance is determined to be the predetermined distance or less (Yes in Step S404), the comment list creating unit 223 calculates a display angle based on the capture direction information of the positioning data m and the comment direction in Step S405. Then, the comment list creating unit 223 adds the calculated display angle, the relative reproduction time of the video data calculated based on the positioning data m, and the comment character string to the comment list in Step S406.

Thereafter, in a case where the loop variable m satisfies the end condition of the loop A in Step S407, the comment list creating unit 223 ends the process. On the other hand, in a case where the end condition is not satisfied, the comment list creating unit 223 returns the process to Step S401 and performs the above-described processes. In other words, in a case where it is determined that the comment is not displayable (No in Step S402), in a case where the calculated distance is longer than the predetermined distance (No in Step S404), the comment list creating unit 223 performs the above-described processes until the loop variable m satisfies the end condition of the loop A.

In the comment list creating process according to the second embodiment, since the display angle calculated based on the capture direction information of video changes, a duplicate determination represented in Step S205 has been described not to be performed. Accordingly, in the second embodiment, there is a possibility that the same comment character string is recorded in the comment list a plurality of times. In Step S406, as described above, in a case where the display angle is not in a predetermined angle range, a corresponding character string may not be added to the comment list.

Effects of Second Embodiment

As described above, by adding the direction information to a comment, the comment creating-displaying device 200 can display a comment character string at an appropriate position on video (or a display screen) that is in the middle of reproduction. In addition, the display/non-display of the comment character string can be controlled in accordance with the comment direction, and accordingly, the comment creating-displaying device 200 can suppress the display of a comment character string for a target object that is not displayed in the video.

Third Embodiment

In the first embodiment described above, the case has been described in which comment character strings corresponding to comment coordinate values each having a distance between the positioning point of the positioning data of video that is in the middle of reproduction and the comment coordinate value to be a predetermined distance or less are added to the comment list. In a third embodiment, a case will be described in which a useful comment character string is added to a comment list with a high priority.

More specifically, in the third embodiment, in a case where a plurality of comment character strings to be displayed during the reproduction of video are present; there is a possibility that it is not preferable to display the plurality of comment character strings in the comment display area 21 at one time. Thus, comment character strings required to be displayed and comment character strings that may not be displayed are sorted out. In the sorting out of comment character strings, the degree of similarity between metadata relating to video that is in the middle of reproduction and metadata of video corresponding to the comment character string is calculated as an evaluation value, and comment character strings having relatively high evaluation values are added to the comment list.

Figure 14:
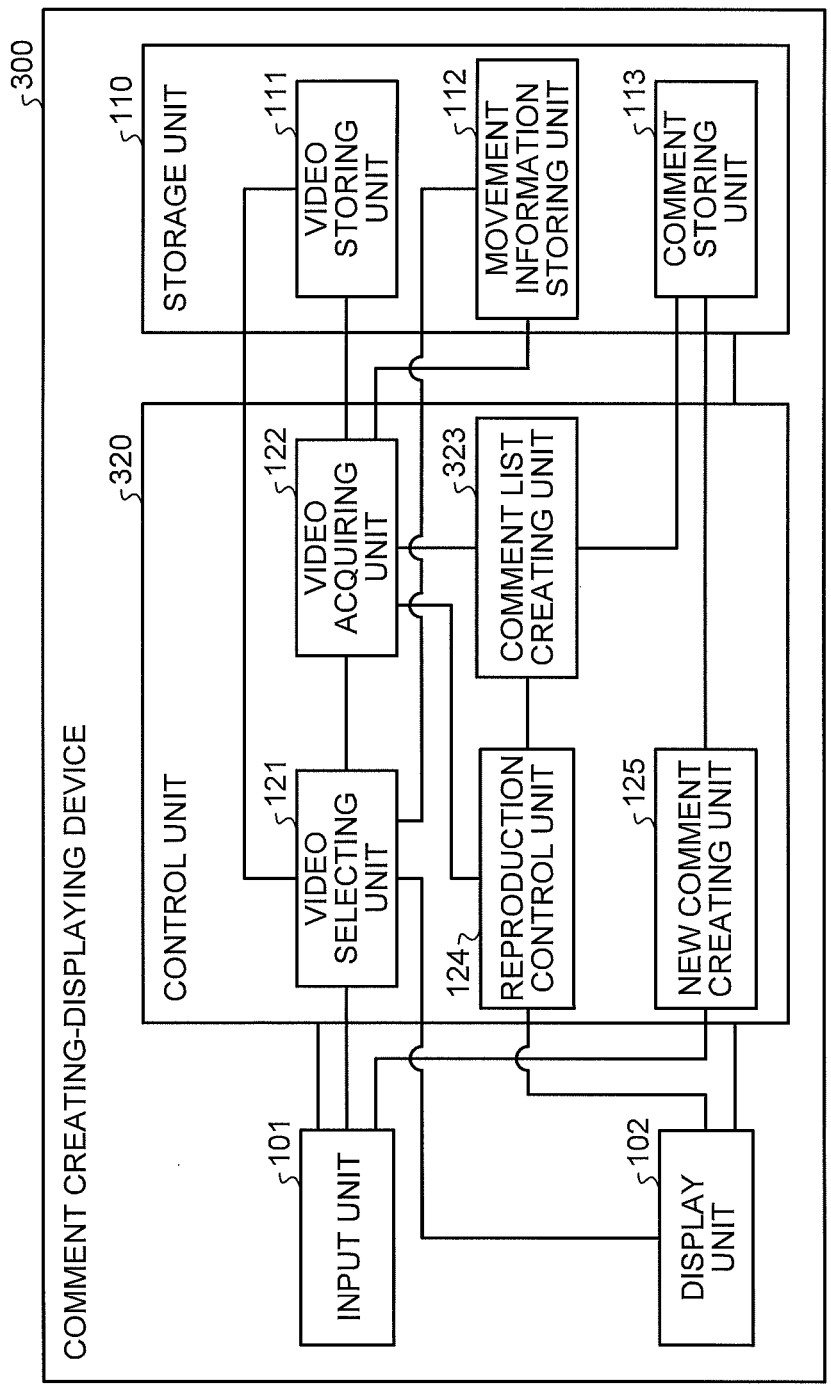
FIG. 14 is a functional block diagram that illustrates an example of a comment creating-displaying device according to a third embodiment.

Configuration of Comment Creating-Displaying Device According to Third Embodiment The configuration of a comment creating-displaying device according to the third embodiment will be described with reference to FIG. 14. FIG. 14 is a functional block diagram that illustrates an example of the configuration of the comment creating-displaying device according to the third embodiment. In FIG. 14, the same reference numeral is assigned to the same configuration as that of the comment creating-displaying device 100 according to the first embodiment, and detailed description of the same configuration may be omitted. In the third embodiment, the functions, the configurations, and the processes of units other than a comment list creating unit 323 of a control unit 320 are the same as those of the first embodiment.

As illustrated in FIG. 14, a comment creating-displaying device 300 includes an input unit 101, a display unit 102, a storage unit 110, and the control unit 320. The storage unit 110 includes a video storing unit 111, a movement information storing unit 112, and a comment storing unit 113. The control unit 320 includes a video selecting unit 121, a video acquiring unit 122, the comment list creating unit 323, a reproduction control unit 124, and a new comment creating unit 125.

The comment list creating unit 323 creates a comment list based on the positioning data notified of from the video acquiring unit 122 and information stored in the comment storing unit 113. More specifically, the comment list creating unit 323 calculates a distance between each positioning point of the positioning data notified of from the video acquiring unit 122 and the comment coordinate value stored in the comment storing unit 113. Then, the comment list creating unit 323 calculates a comment evaluation value for comment information having a comment coordinate value for which the calculated distance is predetermined distance or less.

Such a comment evaluation value is acquired by: acquiring metadata of video based on the video ID corresponding to a comment coordinate value having the distance being the predetermined distance or less; comparing the acquired metadata with the metadata of a video ID of video that is in the middle of reproduction; and setting an evaluation equation such that a comment evaluation value of a comment coordinate value having closer metadata has a higher value. Here, metadata being close to other metadata represents that the degree of similarity between metadata and other metadata is high. For example, when the number of units of metadata to be evaluated is denoted by "N", a variable representing the coincidence state of the k-th metadata as "1" or "0" is denoted by "$c_k$", and the weighting factor of the k-th metadata is denoted by "$\alpha_k$", the comment evaluation value "e" is acquired by using Numerical Expression (6). In Numerical Expression (6), an arbitrary value is set to the weighting factor "$\alpha_k$" by the user.

$$e = \sum_{k=1}^{N} a_k c_k \tag{6}$$

Hereinafter, an example of the calculation of a comment evaluation value will be described. For example, the metadata is assumed to include a season, the weather at the time of capture, and the vehicle type. In addition, it is assumed that a weighting factor of the season is "0.2", a weighting factor of the weather is "0.3", and a weighting factor of the vehicle type is "0.5". In the metadata of video selected by the video selecting unit 121, in other words, the metadata of video that is in the middle of reproduction, it is assumed that the season is spring, the weather is "fair", and the vehicle type is a "wagon".

In the above-described state, in the metadata of video corresponding to a specific comment coordinate value, it is assumed that the season is "summer", the weather is "rainy", and the vehicle type is a "wagon". In other words, the coincidence between the above-described metadata and the metadata of the video corresponding to the specific comment coordinate value occurs only in the vehicle type "wagon". The comment evaluation value at this time is "0.2×0+0.3×0+0.5×1=0.5". In addition, when the video ID is the same, the entire metadata is the same, and accordingly, the comment evaluation value is "0.2×1+0.3×1+0.5×1=1".

The comment list creating unit 323 that has acquired the comment evaluation value adds a comment character string corresponding to each comment evaluation value that is a predetermined evaluation value or more and the relative reproduction time to the comment list. Here, the purpose of the addition to the comment list is to limit the number added to the comment list, and accordingly, a predetermined number of comment character strings having relatively high comment evaluation values may be added to the comment list, or only a comment character string having the highest comment evaluation value may be added to the comment list.

Entire Process Flow According To Third Embodiment

Figure 15:
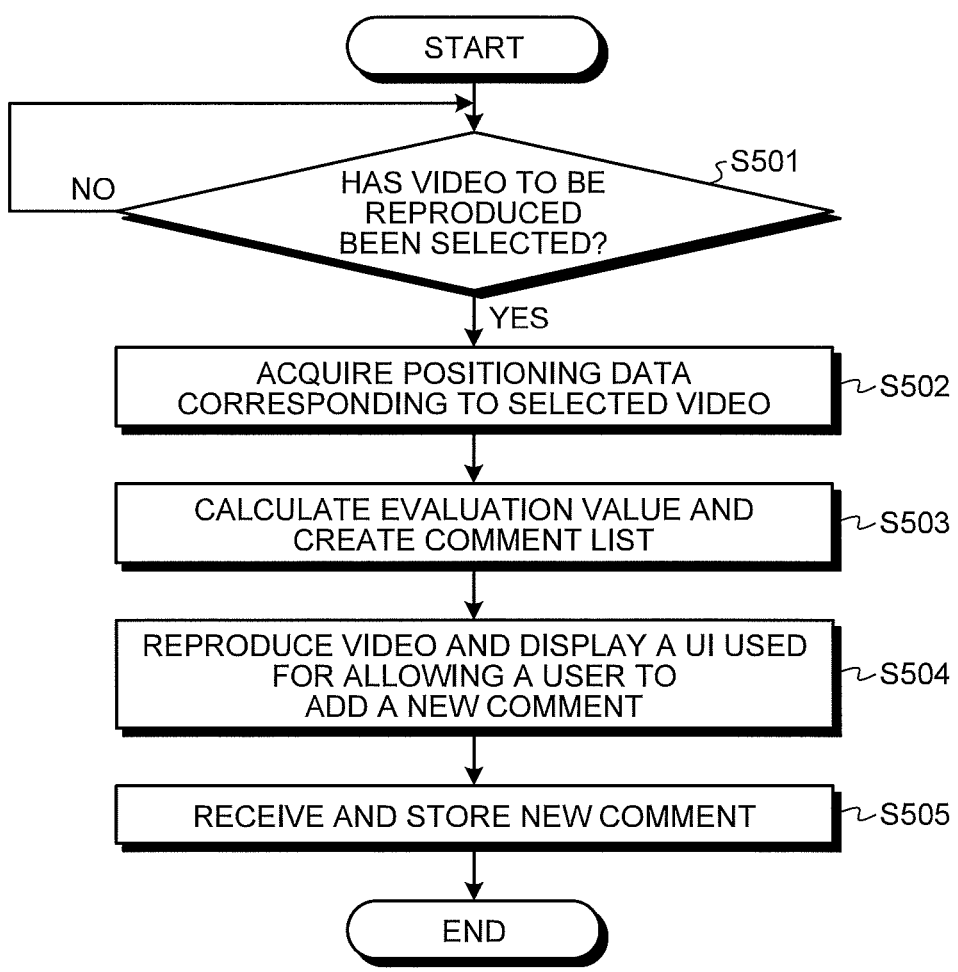
FIG. 15 is a flowchart that illustrates an example of the flow of the entire process performed in the comment creating-displaying device according to the third embodiment.

Next, the entire process flow performed in the comment creating-displaying device 300 according to the third embodiment will be described with reference to FIG. 15. FIG. 15 is a flowchart that illustrates an example of the flow of the entire process performed in the comment creating-displaying device 300 according to the third embodiment.

As illustrated in FIG. 15, in a case where video to be reproduced has been selected in a UI used for allowing a user to select video that is a reproduction target, which is created by the video selecting unit 121 and is displayed on the display unit 102, (Yes in Step S501); the video acquiring unit 122 acquires video data corresponding to the video ID of the selected video from the video storing unit 111 and acquires positioning data including positioning time and a positioning point from the movement information storing unit 112 in Step S502. On the other hand, in a case where video to be reproduced has not been selected (No in Step S501); the video acquiring unit 122 is in a state waiting for the selection of video to be reproduced.

The comment list creating unit 323: calculates distances between each positioning point of the positioning data acquired by the video acquiring unit 122 and comment coordinate values stored in the comment storing unit 113; calculates comment evaluation values for comment information having comment coordinate values for which the calculated distances are a predetermined distance or less; and creates a comment list acquired by listing comment character strings for which the comment evaluation values are a predetermined evaluation value or more in Step S503.

The reproduction control unit 124: controls the display of video of video data acquired by the video acquiring unit 122 on the display unit 102 based on the comment list created by the comment list creating unit 323; and displays comment character strings on the display screen, thereby displaying a UI used for allowing a user to add a new comment on the display unit 102 in Step S504. The new comment creating unit 125: receives the input comment character string; receives the video ID, the reproduction time, and the comment coordinate value from the reproduction control unit 124; and stores the comment character string, the video ID, the reproduction time, and the comment coordinate value, which have been received, in the comment storing unit 113 in Step S505.

Flow of Comment List Creating Process According to Third Embodiment

Figure 16:
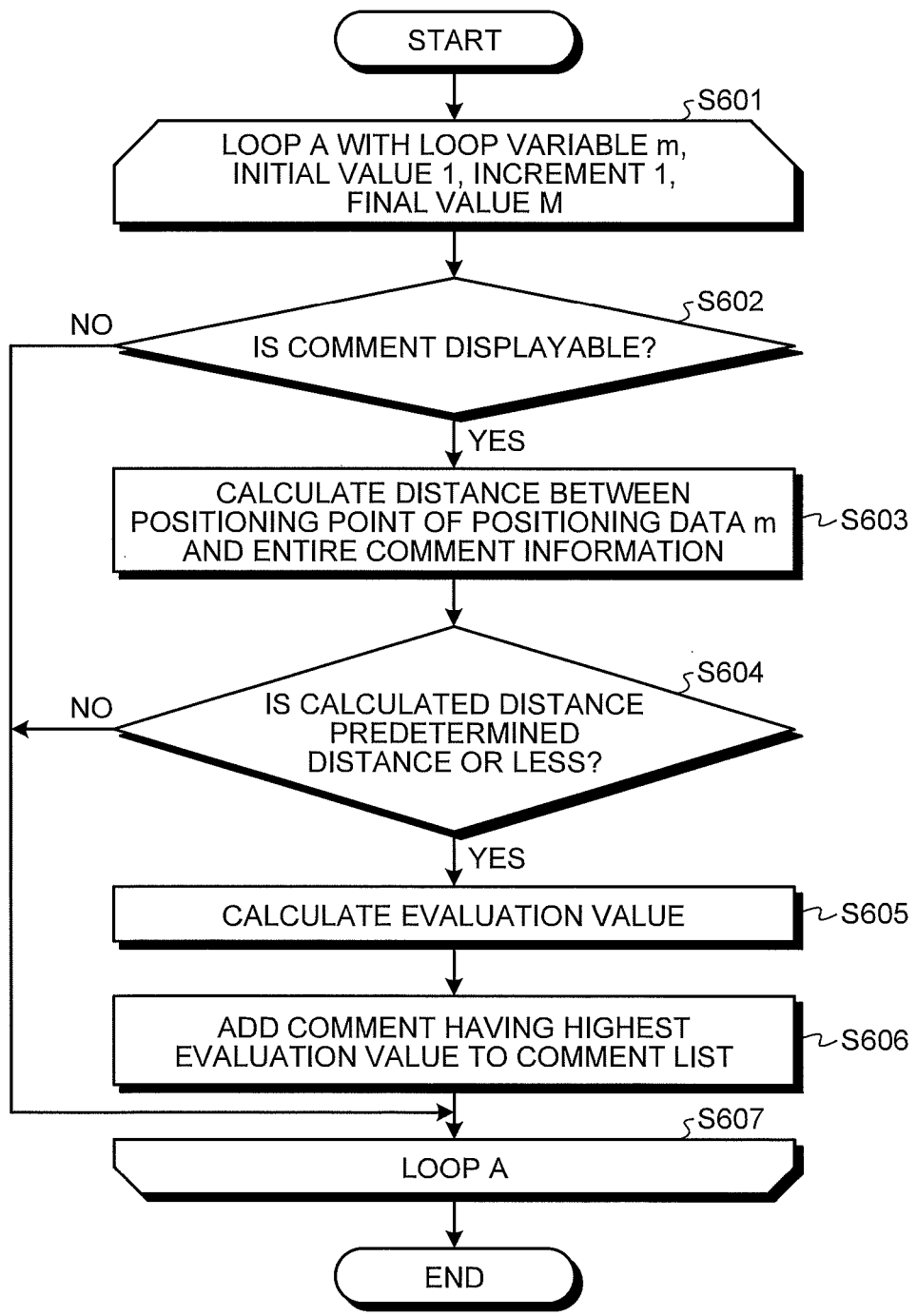
FIG. 16 is a flowchart that illustrates an example of the flow of a comment list creating process according to the third embodiment.

Next, the flow of a comment list creating process according to the third embodiment will be described with reference to FIG. 16. FIG. 16 is a flowchart that illustrates an example of the flow of the comment list creating process according to the third embodiment. The comment list creating process according to the third embodiment mainly represents a process performed by the comment list creating unit 323. A case will be described as an example with reference to FIG. 16 in which a comment character string having a highest evaluation value is added to a comment list.

As illustrated in FIG. 16, the comment list creating unit 323 sets the number of units of the positioning data acquired by the video acquiring unit 122 to "M" and starts looping a loop A with an initial value of "1" and an increment of "1" until a loop variable "m" becomes a final value "M" in Step S601. Hereinafter, the m-th positioning data may be referred to as "positioning data m".

Then, the comment list creating unit 323 determines whether or not a difference between relative time acquired from the positioning time of the positioning data m and relative reproduction time corresponding to the comment character string that has been added to the comment list last is a display time of the comment character string or more, thereby determining whether or not the comment character string is displayable in Step S602. At this time, in a case where the comment character string is determined to be displayable (Yes in Step S602), the comment list creating unit 323 calculates distances between the positioning point of the positioning data m and all the comment coordinate values stored in the comment storing unit 113 in Step S603.

Subsequently, the comment list creating unit 323 determines whether the calculated distance is a predetermined distance or less in Step S604. In a case where the calculated distance is determined to be the predetermined distance or less (Yes in Step S604); by comparing metadata of video of a video ID corresponding to the comment coordinate value for which the calculated distance is the predetermined distance or less and the metadata of the video that is in the middle of reproduction with each other; the comment list creating unit 323 calculates a comment evaluation value of a comment character string corresponding to each comment coordinate value in Step S605. Then, the comment list creating unit 323 adds relative reproduction time of the video data calculated from the positioning data m and a comment character string having a highest comment evaluation value to the comment list in Step S606.

Thereafter, in a case where the loop variable m satisfies the end condition of the loop A in Step S607, the comment list creating unit 323 ends the process. On the other hand, in a case where the end condition is not satisfied, the comment list creating unit 323 returns the process to Step S601 and performs the above-described process. In other words, in a case where the comment is determined to be not displayable (No in Step S602), in a case where the calculated distance is longer than the predetermined distance (No in Step S604), the comment list creating unit 323 performs the above-described process until the loop variable m satisfies the end condition of the loop A.

Effects of Third Embodiment

As described above, since the comment creating-displaying device 300 determines a comment character string that is input during browsing of video having capture conditions and the like to be close to those of the video that is in the middle of reproduction as a comment character string to be displayed on the display screen on which the video that is in the middle of reproduction is displayed, a comment character string having a higher degree of relation can be displayed.

Fourth Embodiment

Until now, the comment creating-displaying devices 100, 200, and 300 according to the embodiments of the present invention have been described. However, in addition to the above-described embodiments, various other embodiments may be implemented. Thus, the other embodiments different from the above-described embodiments in (1) the display time of the comment, (2) the coordinate value of the comment display area, (3) the process according to the comment evaluation value, (4) the position of the comment display area, (5) the configuration, and (6) the program will be described.

(1) Display Time of Comment

In the first embodiment, the display time of the comment character strings has been described as being a constant time such as five seconds. However, such a display time of the comment character strings may be dynamically changed. For example, the comment character strings may be displayed until a distance between the positioning point of the positioning data and the comment coordinate value is a predetermined value or more. In addition, the display time may be changed in accordance with the speed like in a case where the comment character strings are displayed longer as the speed measured by using a GPS or the like is slower.

(2) Coordinate Value of Comment Display Area

In the second embodiment described above, a case has been described in which the comment display area 21 is moved in the direction of the x axis, and the direction of the comment and the like are calculated by using the x coordinate value of the upper left side of the comment display area 21. For such a coordinate value, a y coordinate value may be used. For example, the comment display area 21 is also moved in the direction of the y axis, the y coordinate value "$y_c$" of the comment display area 21 is output to the direction designating unit 226 at the time of pressing the determination button 26, and a comment direction calculated based on the y coordinate value "y," is used.

(3) Process According to Comment Evaluation Value

In the third embodiment, a case has been described in which a comment character string having a high comment evaluation value, which is calculated, is added to the comment list. Such a comment evaluation value may also be used in a case where the comment character string is displayed on the screen. For example, in a case where a comment character string is displayed on the display screen, the reproduction control unit 124 may change the size, the color, and the like of the comment character string to be displayed based on the comment evaluation value.

(4) Position of Comment Display Area

Figure 17:
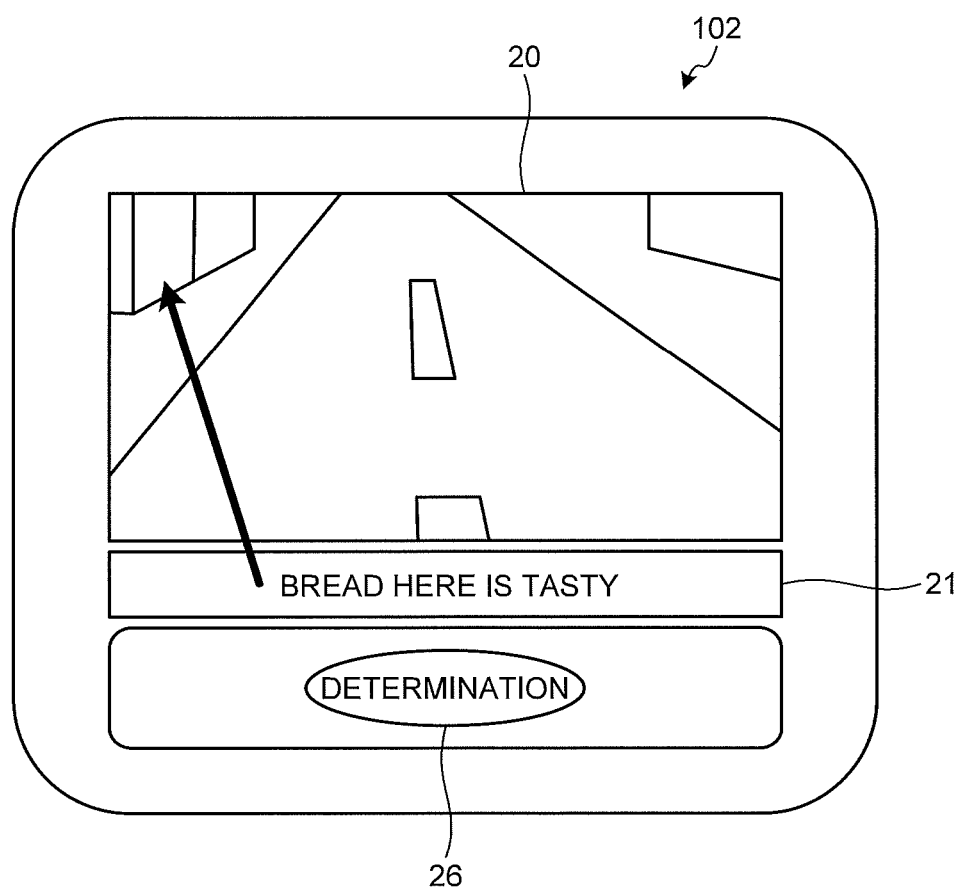
FIG. 17 is a diagram that illustrates Example (1) in which a comment display area is displayed outside video.

In the second embodiment described above, a case has been described in which the comment display area 21 is superimposed on the video. Such the comment display area 21 may not be superimposed on the video. FIG. 17 is a diagram that illustrates Example (1) in which the comment display area 21 is displayed outside the video. For example, as illustrated in FIG. 17, the comment display area 21 is arranged outside the video reproduction area 20. In the example illustrated in FIG. 17, the character string "The bread here is tasty" input into the comment input area 22 is displayed in the comment display area 21 that is arranged outside the video reproduction area 20. A user moves the distal end of the arrow by operating a cursor pointer 25 (not illustrated in the figure) and presses the determination button 26. Then, the reproduction control unit 224 outputs the video ID of video at the time of pressing the button, the reproduction time, and the comment coordinate value to the new comment creating unit 225. In addition, the reproduction control unit 224 outputs the x coordinate value of the distal end of the arrow, the width of the video, and the width of the comment character string to the direction designating unit 226. From these, a display angle corresponding to the comment character string input into the comment display area 21 is calculated, and the comment character string corresponding to the display angle is displayed during the reproduction of the video. The display position of the comment display area 21 at this time may be outside the video reproduction area 20, and the position corresponding to the display angle may be indicated by using an arrow. Here, the arrangement position of the comment display area 21 is not limited to the position illustrated in FIG. 17.

Figure 18:
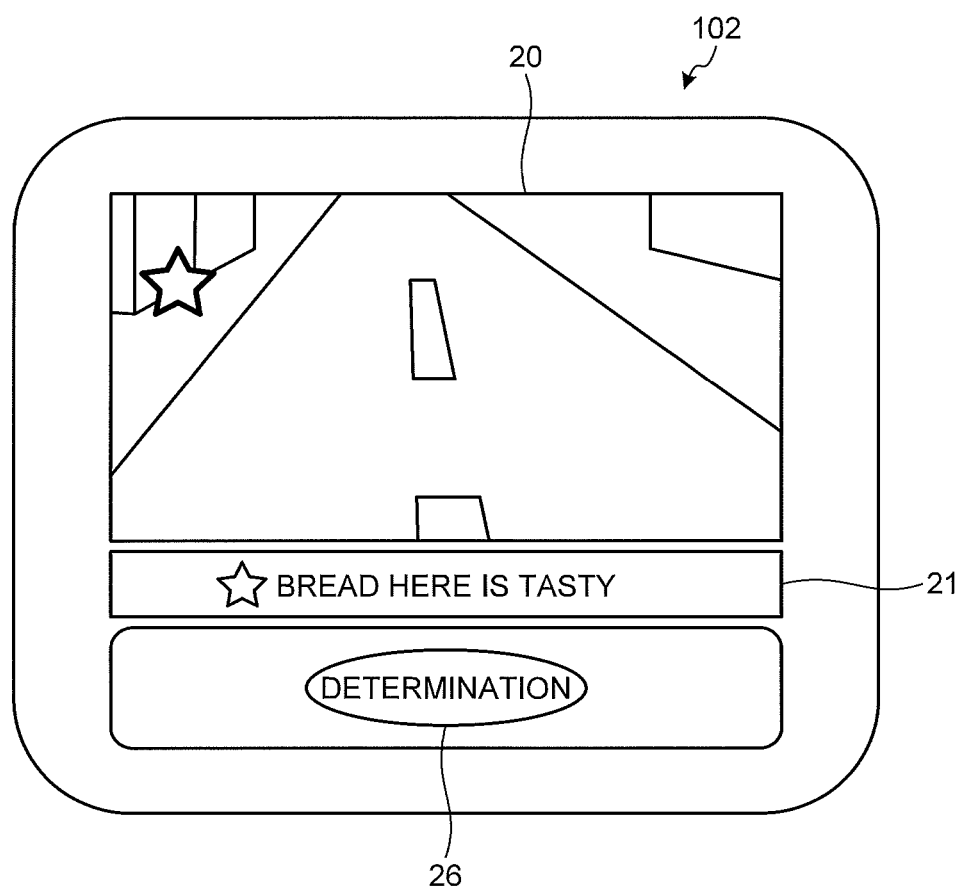
FIG. 18 is a diagram that illustrates Example (2) in which a comment display area is displayed outside video.

FIG. 18 is a diagram that illustrates Example (2) in which the comment display area 21 is displayed outside video. For example, as illustrated in FIG. 18, the comment display area 21 is arranged outside the video reproduction area 20. In the example illustrated in FIG. 18, the character string "The bread here is tasty" input into the comment input area 22 is displayed in the comment display area 21 that is arranged outside the video reproduction area 20. A user moves a marker such as a star mark by operating the cursor pointer 25 (not illustrated in the figure) and presses the determination button 26. Then, the reproduction control unit 224 outputs the video ID of video at the time of pressing the button, the reproduction time, and the comment coordinate value to the new comment creating unit 225. In addition, the reproduction control unit 224 outputs the x coordinate value of the marker such as the star, the width of the video, and the width of the comment character string to the direction designating unit 226. From these, a display angle corresponding to the comment character string input into the comment display area 21 is calculated, and the comment character string corresponding to the display angle is displayed during the reproduction of the video. The display position of the comment display area 21 at this time may be outside the video reproduction area 20, and a position corresponding to the display angle may be indicated by using a marker such as a star mark. Here, the arrangement position of the comment display area 21 is not limited to the position illustrated in FIG. 18.

(5) Configuration

The processing sequence, the control sequence, specific names, and information including various kinds of data, parameters, and the like, which have been illustrated in this specification, the figures, and the like, may be arbitrarily changed unless otherwise noted. For example, the metadata used for calculating a comment evaluation value is not limited to the above-described data.

The constituent elements of the comment creating-displaying devices 100, 200, and 300 illustrated in the figures are functional and conceptual elements but do not need to be necessarily physically configured as illustrated in the figure. In other words, specific forms of the separation or integration of the devices are not limited to those illustrated in the figure, but all or some thereof may be functionally or physically separated or integrated depending on various loads, use circumstances, or the like.

For example, the comment list creating unit 123 and the reproduction control unit 124 may be integrated as a "comment reproduction control unit" that acquires positioning data corresponding to the reproduction time and acquires and displays a comment character string having a coordinate value that is closest to the positioning data for each process of the reproduction of video. In other words, according to the "comment reproduction control unit", a comment character string displayed in the middle of reproduction of video is not extracted in advance as a list, but a comment character string is extracted and displayed on every reproduction time.

(6) Program

Each of the comment creating-displaying devices 100, 200, and 300 according to the above-described embodiments is includes: a control device such as a CPU; a storage device such as read only memory (ROM) or random access memory (RAM); an external storage device such as a hard disk drive (HDD); a display device such as a touch panel or a display apparatus; and an input device such as a mouse or a keyboard and has a hardware configuration using an arbitrary terminal or an arbitrary information processing device.

Comment creating-displaying programs that are executed by the comment creating-displaying devices 100, 200, and 300 according to the above-described embodiments are provided in an installable form or an executable form by being recorded on a storage medium such as a CD-ROM, a flexible disk (FD), a CD-R, or a digital versatile disk (DVD) that can be read by a terminal or an information processing device.

The comment creating-displaying programs that are executed by the comment creating-displaying devices 100, 200, and 300 according to the embodiments may be configured so as to be provided by being stored on a computer connected to a network such as the Internet and downloaded through the network. In addition, the comment creating-displaying programs that are executed by the comment creating-displaying devices 100, 200, and 300 according to the above-described embodiments may be configured to be provided or distributed through a network such as the Internet. Furthermore, the comment creating-displaying programs according to above-described embodiments may be configured so as to be provided by being built in ROM or the like.

Each of the comment creating-displaying programs that are executed by the comment creating-displaying devices 100, 200, and 300 according to the embodiments has a module configuration including: the above-described units (the comment storing unit 113; the video acquiring unit 122; the comment list creating unit 123; the reproduction control unit 124; and the new comment creating unit 125). Thus, as actual hardware, as the CPU (processor) reads the comment displaying and creating program from the storage medium, the storage device, or the like and executes the read comment displaying and creating program, the above-described units are loaded on a main storage device, and the comment storing unit 113, the video acquiring unit 122, the comment list creating unit 123, the reproduction control unit 124, and the new comment creating unit 125 are created on the main storage device.

As described above, according to these embodiments, at least the following contents are disclosed.

The comment creating-displaying devices according to the above-described embodiments include: a comment storing unit; an acquisition unit; a reproduction control unit; and a comment list creating unit. The comment storing unit stores comment information in which a comment character string representing a character string displayed during reproduction of video captured during movement and a comment coordinate value representing coordinate information of a capture location at which the comment character string is displayed are associated with each other. The acquisition unit acquires positioning data that is information including the video, positioning time representing time when the capture location of the video is positioned, and a positioning point representing coordinate information of the capture location of the video. The reproduction control unit controls reproduction of the video acquired by the acquisition unit. The comment list creating unit creates the comment character strings, having a distance from the positioning point of the positioning data corresponding to the reproduction time of video that is in the middle of reproduction to be predetermined distance or less, corresponding to the comment coordinate value stored in the comment storing unit as a list. In addition, the reproduction control unit displays the comment character string on the display screen on which the video is displayed based on the created comment list.

In addition, the comment creating-displaying device according to the above-described embodiments include: an acquisition unit; a reproduction control unit; and a new comment creating unit. The acquisition unit acquires video that is captured during movement and positioning data that is information including positioning time representing time when a capture location of the video is positioned and a positioning point representing coordinate information of the capture location. The reproduction control unit controls the reproduction of the video acquired by the acquisition unit. The new comment creating unit receives a comment that is input during the reproduction of the video, acquires the coordinate information of the capture location corresponding to the reproduction time of the video at the time of inputting the comment, which is estimated based on the positioning time of the positioning data, and creates new comment information that represents information including the received comment and the coordinate information of the acquired capture location.

According to an aspect of the present invention, there is an advantage of being capable of displaying a comment that corresponds to the location corresponding to video that is in the middle of reproduction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A comment creating-displaying device comprising:
   a comment storing unit that stores comment information in which a comment character string representing a character string displayed during reproduction of video captured during movement and a comment coordinate value representing coordinate information of a capture location at which the comment character string is displayed are associated with each other;
   a first acquisition unit that acquires positioning data that is information including the video, positioning time representing time when the capture location of the video is positioned, and a positioning point representing coordinate information of the capture location of the video;
   a reproduction control unit that controls reproduction of the acquired video; and
   a second acquisition unit that acquires the comment character string, which has a distance from the positioning point of the positioning data corresponding to the reproduction time of the video that is in the middle of the reproduction to be a predetermined distance or less, corresponding to the comment coordinate value stored in the comment storing unit,
   wherein the reproduction control unit displays the acquired comment character string on a display screen on which the video is displayed.

2. The comment creating-displaying device according to claim 1,
   wherein the comment storing unit stores comment information in which a comment direction representing the direction of a comment in the video is further associated,
   the first acquisition unit further acquires capture direction information that represents direction information at the time of capturing the video,
   the second acquisition unit acquires the comment direction corresponding to the comment character string from the comment storing unit and calculates a display angle of the comment character string displayed on the display screen based on the acquired comment direction and the acquired capture direction information, and
   the reproduction control unit displays the comment character string on the display screen based on the calculated display angle.

3. The comment creating-displaying device according to claim 2, wherein the reproduction control unit displays the comment character string having the calculated display angle satisfying a predetermined angle on the display screen.

4. The comment creating-displaying device according to claim 1,
   wherein the second acquisition unit further creates a comment list that represents data in which the comment character strings and the positioning time corresponding to the comment character strings are respectively combined, and
   the reproduction control unit displays the comment character strings included in the created comment list on the display screen and, in a case where one of the comment character strings included in the comment list is selected, controls reproduction of the video corresponding to the positioning point of the positioning time of the selected comment character string.

5. The comment creating-displaying device according to claim 1,
   wherein the comment storing unit stores comment information in which a video identifier used for identifying the video corresponding to the comment character string is further associated,
   the second acquisition unit further creates a comment list that represents data in which the comment character strings and the video identifiers corresponding to the comment character strings are respectively combined, and the reproduction control unit displays the comment character strings included in the created comment list on the display screen and, in a case where one of the comment character strings included in the comment list is selected, controls reproduction of the video corresponding to the video identifier of the selected comment character string.

6. The comment creating-displaying device according to claim 5,
wherein the comment storing unit stores comment information in which a comment identifier used for identifying the comment character string is further associated,
the second acquisition unit creates a comment list that represents data in which the comment identifier is further combined, and
the reproduction control unit displays the comment character strings included in the created comment list on the display screen and, in a case where one of the comment character strings included in the comment list is selected, controls reproduction of the video corresponding to the video identifier of the selected comment character string in accordance with reproduction time corresponding to the comment identifier.

7. The comment creating-displaying device according to claim 1,
wherein the comment storing unit stores comment information in which a video identifier used for identifying the video corresponding to the comment character string is further associated,
the first acquisition unit further acquires video metadata that represents metadata of the video, and
the second acquisition unit calculates the degree of similarity as an evaluation value by comparing the video metadata of the video corresponding to the video identifier of the comment character string and the video metadata of the video that is in the middle of the reproduction with each other and acquires the comment character string for which the calculated evaluation value is a predetermined evaluation value or more.

8. The comment creating-displaying device according to claim 1, further comprising a new comment creating unit that receives a comment input during the reproduction of the video, acquires the coordinate information of the capture location corresponding to the reproduction time of the video at the time of inputting the comment, which is estimated based on the positioning time of the positioning data, creates new comment information representing information including the received comment and the acquired coordinate information of the capture location, sets the comment included in the created new comment information as the comment character string, and stores the coordinate information included in the new comment information in the comment storing unit as the comment coordinate value.

9. The comment creating-displaying device according to claim 8, further comprising a comment direction designating unit that receives designation of a comment position representing a position in the video corresponding to the input comment and calculates a comment direction representing the direction of the comment in the video by using the comment position of which the designation is received,
wherein the first acquisition unit further acquires capture direction information that represents direction information at the time of capturing the video, and
the new comment creating unit creates the new comment information that further includes the comment direction and stores the comment direction in the comment storing unit together with the comment and the coordinate information.

10. A method of creating and displaying a comment, the method comprising:
acquiring video that is captured during movement and positioning data that is information including positioning time representing time when a capture location of the video is positioned and a positioning point representing coordinate information of the capture location of the video;
controlling reproduction of the acquired video;
acquiring a comment character string, which has a distance from the positioning point of the positioning data corresponding to the reproduction time of the video that is in the middle of the reproduction to be a predetermined distance or less, corresponding to the comment coordinate value from a comment storing unit storing comment information in which the comment character string representing a character string displayed during the reproduction of the video and a comment coordinate value representing coordinate information of a capture location at which the comment character string is displayed are associated with each other; and
displaying the acquired comment character string on the display screen on which the video is displayed.

11. The method according to claim 10, further comprising receiving a comment input during the reproduction of the video, acquiring the coordinate information of the capture location corresponding to the reproduction time of the video at the time of inputting the comment, which is estimated based on the positioning time of the positioning data, creating new comment information representing information including the received comment and the acquired coordinate information of the capture location, setting the comment included in the created new comment information as the comment character string, and storing the coordinate information included in the new comment information in the comment storing unit as the comment coordinate value.

12. A computer program product comprising a non-transitory computer usable medium having computer readable comment creating-displaying program that causes a computer to execute:
acquiring video that is captured during movement and positioning data that is information including positioning time representing time when a capture location of the video is positioned and a positioning point representing coordinate information of the capture location of the video;
controlling reproduction of the acquired video;
acquiring a comment character string, which has a distance from the positioning point of the positioning data corresponding to the reproduction time of the video that is in the middle of the reproduction to be a predetermined distance or less, corresponding to the comment coordinate value from a comment storing unit storing comment information in which the comment character string representing a character string displayed during the reproduction of the video and a comment coordinate value representing coordinate information of a capture location at which the comment character string is displayed are associated with each other; and
displaying the acquired comment character string on the display screen on which the video is displayed.

13. The computer program product according to claim 12 that causes a computer to further execute:

receiving a comment input during the reproduction of the video, acquiring the coordinate information of the capture location corresponding to the reproduction time of the video at the time of inputting the comment, which is estimated based on the positioning time of the positioning data;

creating new comment information representing information including the received comment and the acquired coordinate information of the capture location;

setting the comment included in the created new comment information as the comment character string; and storing the coordinate information included in the new comment information in the comment storing unit as the comment coordinate value.

* * * * *